United States Patent [19]

Anderson

[11] 4,162,907

[45] Jul. 31, 1979

[54] GLASS SHEET MANUFACTURING METHOD AND APPARATUS

[76] Inventor: Frank Anderson, 1105 Beech Ave., Charleston, W. Va. 25302

[21] Appl. No.: 894,510

[22] Filed: Apr. 7, 1978

[51] Int. Cl.$^2$ .................... C03B 18/02; C03B 21/02
[52] U.S. Cl. .................................... 65/29; 65/65; 65/83; 65/99 A; 65/101; 65/174; 65/182 R; 65/183
[58] Field of Search ............... 65/99 A, 182 R, 29, 65/65, 66, 83, 87, 101, 174, 183, 325, 330, 34 T, 337

[56] References Cited

U.S. PATENT DOCUMENTS

| | | | |
|---|---|---|---|
| 696,738 | 4/1902 | Keyes | 65/325 |
| 2,048,830 | 7/1936 | Reis | 65/101 |
| 3,348,936 | 10/1967 | Clark et al. | 65/160 |
| 3,388,204 | 6/1968 | Ellis | 65/337 UX |

*Primary Examiner*—Arthur D. Kellogg
*Attorney, Agent, or Firm*—Oblon, Fisher, Spivak, McClelland & Maier

[57] ABSTRACT

An glass manufacturing process and apparatus having a vertical air-cooled electric furnace and a transverse air-cooled refiner section. The furnace and the refiner are provided with a plurality of molybdenum plate electrode cartridge assemblies. Molten glass is removed from the furnace refiner section by means of a plurality of basin cylinders symmetrically disposed within the transverse refiner. An extruder mechanism accepts molten glass from each basin cylinder and applies the molten glass to a pair of extrusion rolls and onto a molten tin bath. The extrusion rolls are eccentrically pivoted off-center such that the separation distance between them can be varied. A cutting frame is then lowered over the tin bath such that the molten glass sheet is held firmly while it is cut into lite sizes by a cutting mechanism. After cutting, a transfer unit having suction orifices is lowered over the glass sheet and lifts the newly cut glass sheet either to an annealing stage or to a tempering stage. The cut glass sheet then undergoes electronic inspection and packaging.

56 Claims, 27 Drawing Figures

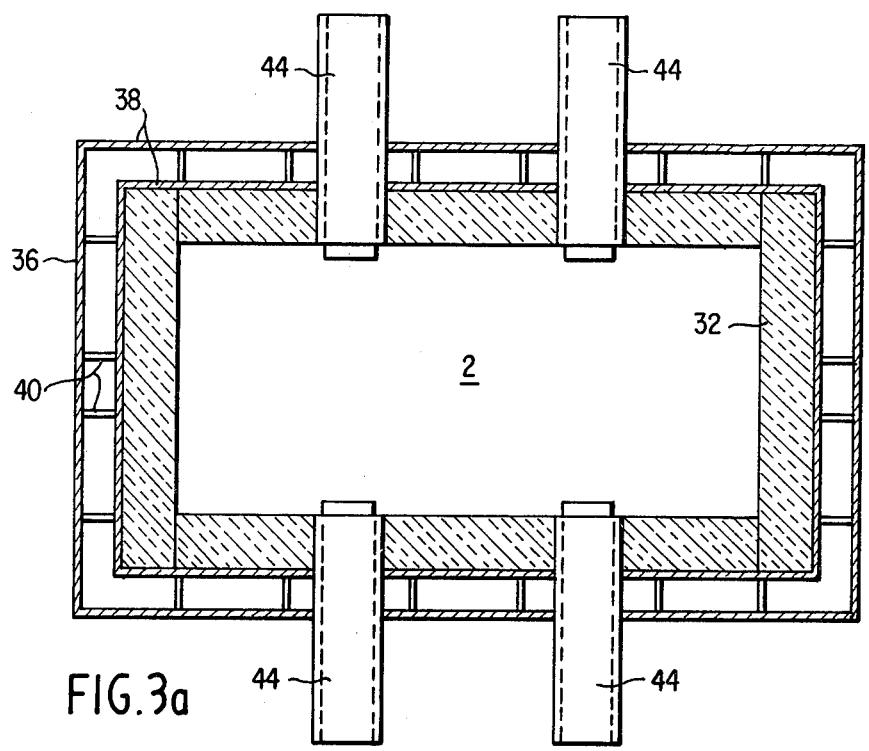
FIG.3a
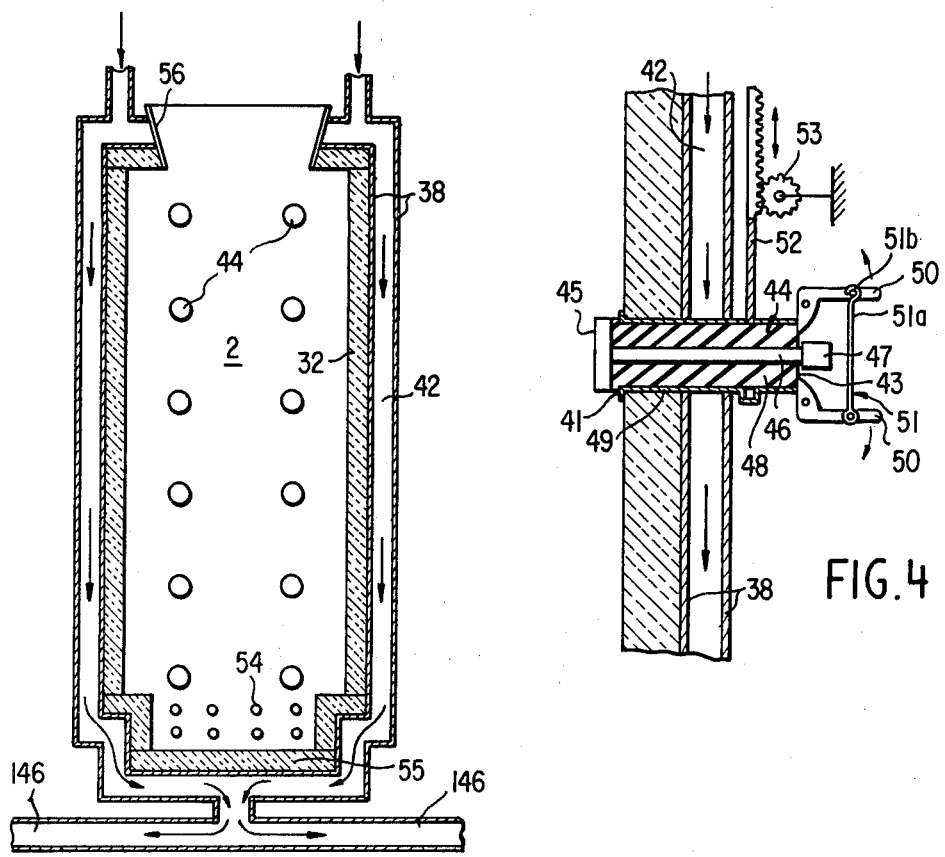
FIG.3b
FIG.4

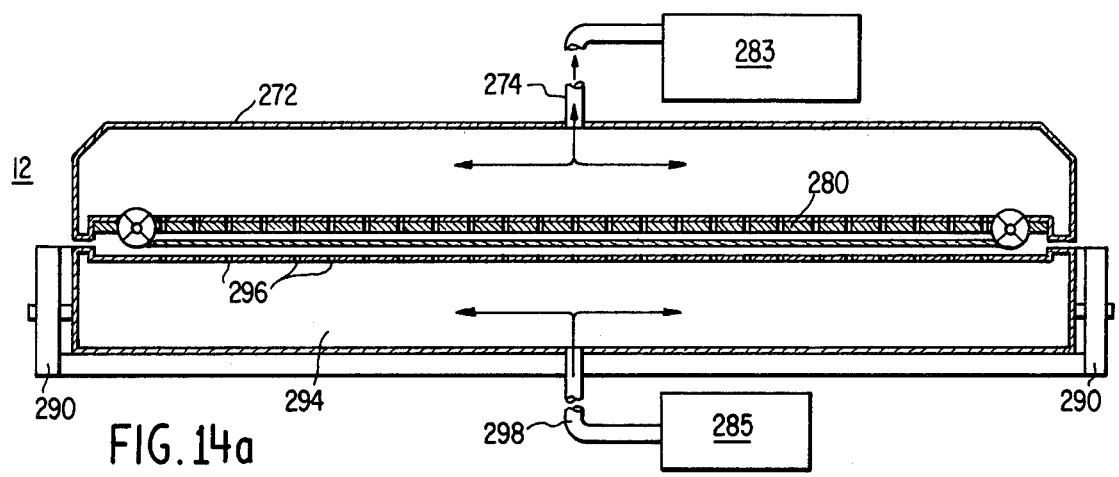
FIG. 14a
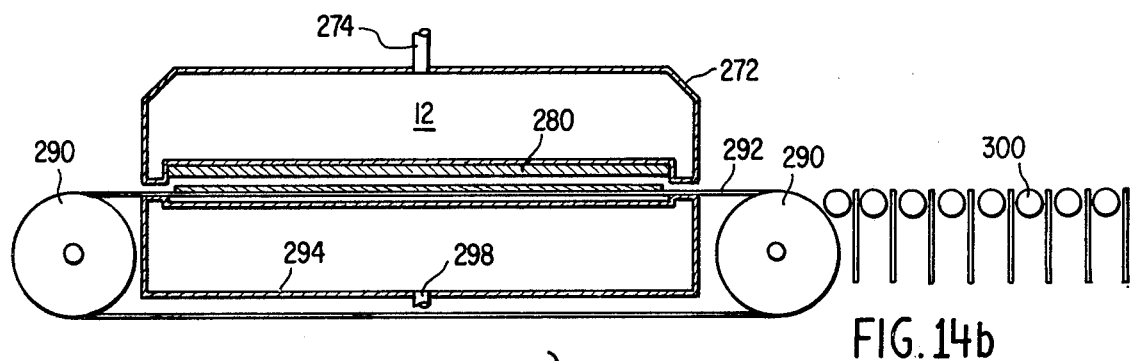
FIG. 14b
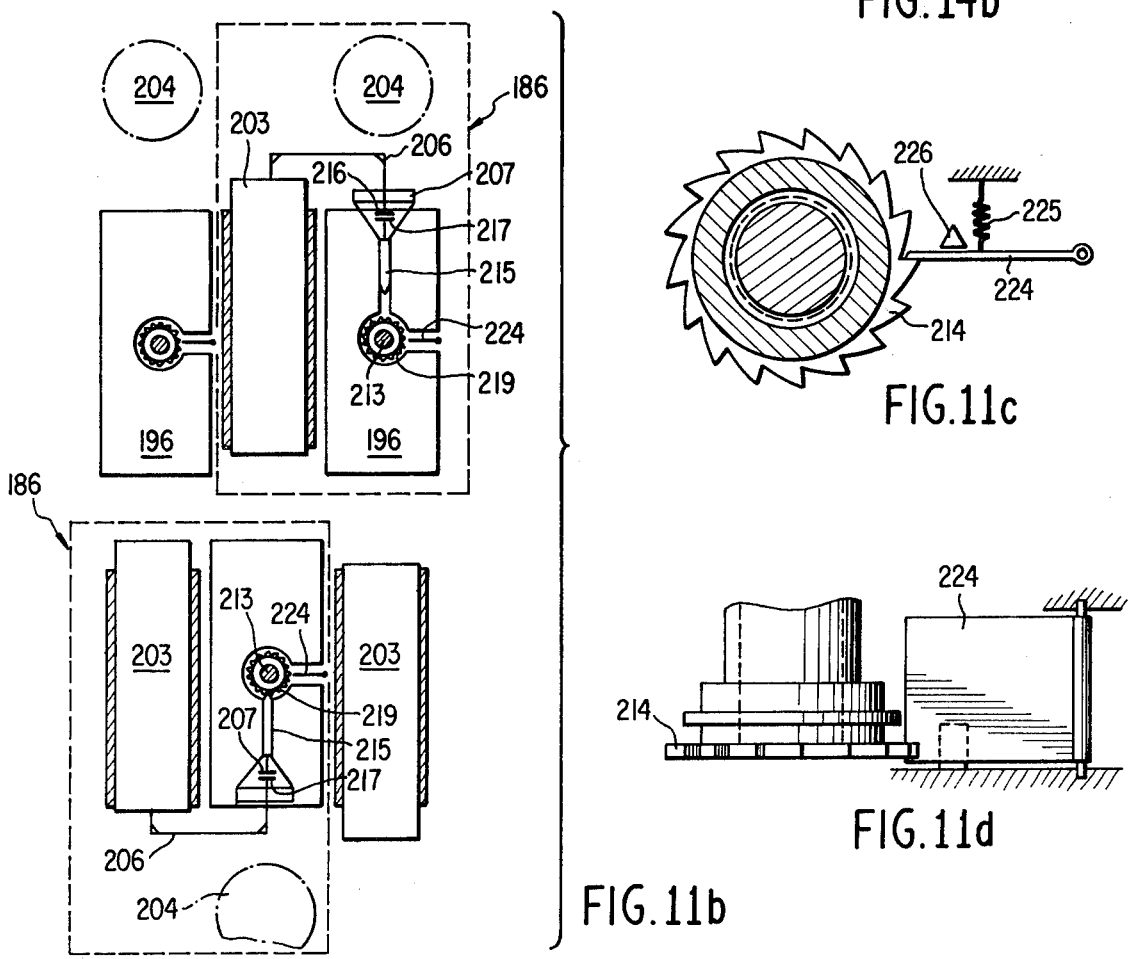
FIG. 11b
FIG. 11c
FIG. 11d

FIG. 12b(ii)

GLASS SHEET MANUFACTURING METHOD AND APPARATUS

BACKGROUND OF THE INVENTION

1. Field of the Invention:

This invention relates to apparata and methods for manufacturing finished flat glass products. More particularly, this invention involves automated and energy efficient improvements in the design of electric furnaces and refiners, glass sheet formation, glass cutting devices, and in glass transfer and tempering mechanisms.

2. Description of the Prior Art:

Various techniques are presently being used to manufacture flat sheet glass. Typically, premixed glass-forming materials are fed onto the surface of a bath of molten glass contained in a furnace. In the fuel firing of the regenerative tank type furnaces, the materials are melted by hot gases from flames playing across the furnace above the glass surface. In the more modern electric furnaces, heat is produced by passing electric current through the bath of molten glass between electrodes immersed in the glass. Also, a combination of both heating methods are sometimes employed.

The furnaces described above assume various shapes. Early regenerative, fuel fired, tank type furnaces were generally horizontal and rectangular in shape with raw material received in one end and molten glass formed in a continuous sheet on the opposite end. This furnace at one time enjoyed considerable popularity in view of the abundance of relatively cheap natural gas energy resources. However, as natural gas fuel became scarce and therefore expensive, the energy consumption deficiencies of the regenerative furnace soon became apparent. In particular, the horizontal regenerative furnace experienced considerable heat loss because of its relatively large exposed cross-sectional areas. Therefore the trend in recent years has been to employ vertical electric furnaces. These furnaces are characterized by smaller cross-sectional area, and therefore less heat loss. However these furnaces likewise have not been without problems. A perennial problem with electric furnaces has been heat localization around the electrodes, and the integrity of the furnace walls surrounding the localized electrode heat pockets. Furtheremore, normal electrode wear requires regular replacement, which has resulted in shut-down of the furnace.

In conventional glass manufacturing furnaces, the glass batch after being melted in the furnace is refined in adjacent refining and melting sections. The adjacent refining section, normally equipped with auxiliary heating means, provides a zone for temperature equalization whereby air bubbles are eliminated and glass homogeneity is effected. Typical glass melting furnaces and refiners are found in U.S. Pat. Nos. 3,636,227; 3,936,290; 3,997,316; 3,998,619; 4,011,070; 4,012,218. Typical glass furnace electrode assemblies are found in U.S. Pat. Nos. 2,798,892; 2,978,526; 3,409,725; 3,517,107; 3,576,385; 3,681,506; 3,740,445; and 3,813,468.

After reaching a state of equilibrium within the refiner stage, the molten glass is withdrawn from the refiner. In the Pittsburgh or Pennvernon sheet glass drawing apparatus a series of pairs of rolls provide tractive force which draws glass upwardly from a bath of molten glass. The thickness of the continuous ribbon of glass is maintained by the speed of the rolls drawing the semi-molten glass from the reservoir. As shown in U.S. Pat. No. 3,420,650 molten glass flows out of the furnace through an aperture in the wall of the furnace and into the bite of a pair of forming rolls which form the molten glass into a continuous ribbon. In the float process, the glass sheet passes from the furnace to forming rolls which determine thickness, and then flows onto a molten tin bath which imparts an ideal flatness to the glass ribbon. In the float process, glass thickness is further controlled by manipulating the glass temperature and speed of advancement to longitudinally stretch the glass, or by installing longitudinally extending fenders within the molten metal bath structure to limit the lateral spreading of the glass as it advances across the molten bath. While these techniques have proven satisfactory in the past, the reproducibility of a precise glass ribbon thickness has been difficult, primarily because of the rather imprecise metering of the molten glass from the furnace.

In conventional glass manufacturing plants, when the glass ribbon is removed from the molten metal bath, it then enters a covered annealing lehr where the temperature of the glass is lowered gradually from the semi-molten state to a rigid and near room temperature cooled glass. The length of the annealing lehrs used in the prior art varies, with some lehrs being several hundred feet in length. The annealing process results in a hardened manageable glass product that can be cut with a diamond or scoring wheel. However, at this stage in the glass manufacturing process, the annealed glass is lacking of impact strength and is susceptible to breakage. Also, when breakage occurs, the annealed glass usually breaks into hazardous jagged fragments.

After annealing, which to a certain extend occurs naturally as the glass is removed from the molten metal bath, it may be desirable to submit the glass ribbon to a tempering process which results in a safety glass. To temper glass, it is necessary to reheat the glass from the annealed state and to return the glass to semi-molten temperatures. Thereafter, sudden chilling of the glass sheet on both sides, simultaneously, with cold air or oil is required. This tempering phase improves the impact strength of the glass sheet by a factor of 4 over the annealed glass sheet. Moreover, when tempered glass is broken, it breaks into relatively harmless, "marble" shaped pieces, rather than the dangerous sharp pointed fragments of broken annealed glass. Unfortunately, the glass sheet once tempered cannot be recut with the ease of the annealed product, and therefore tempered glass is to a larger extent subject to breakage when being cut. It has therefore become necessary that the desired size of the sheet be exact before the tempering phase is performed. Typical methods and apparata for tempering glass sheets are disclosed in U.S. Pat. Nos. 3,488,173; 3,647,409; 3,734,706; 3,841,855; 3,875,766; 3,881,906; 3,923,488; 3,994,711; 3,929,442; and 4,004,901.

In conventional glass cutting apparata, the glass sheet is typically cut by scoring the sheet and then severing the sheet along the score line. Generally, glass sheets of different size are cut by multiple passes of the scorer/severing device. In order to increase the glass production rate, cutter mechanisms of the prior art were reciprocated across the glass ribbon at increased velocity. However, because of the proportionally irregular quality of the high velocity cuts, other techniques were developed for increasing production. As disclosed in U.S. Pat. No. 3,703,115 the cutting means is transported in the same direction as the moving glass ribbon and at substantially the same velocity. As a result, the reciprocating velocity of the cutting means can be discriminately selected. Nevertheless, however, this improvement in cutting speed is limited by the existence of only a single cutting mechanism, and the overall complexity of the system is increased as a result of these velocity control mechanisms.

U.S. Pat. No. 3,983,771 discloses an apparatus for precise subdivision of glass sheets. The subdivision is accomplished by combining the functions of wheel holders and spacing means in a row of spacer blocks whose contiguous surfaces are ground flat and polished with a high degree of accuracy, thereby establishing the spacing between scoring wheels to a high degree of accuracy. Unfortunately, with this cutting scheme, spacer blocks must be manually moved or replaced in order to change the spacing between adjacent scores. Predictably, this feature results in decreased flexibility of the glass cutting operation. Other glass cutting inventions which are considered to be of interest are disclosed in U.S. Pat. Nos. 3,165,017; 3,424,357; 3,754,884; 3,934,995; 4,004,900; and 4,010,677.

SUMMARY OF THE INVENTION

Accordingly, it is the primary object of this invention to provide novel methods and apparata for manufacturing sheet glass which are free of the above-noted disadvantages.

Another object of this invention is to provide a new and improved glass manufacturing furnace.

A further object of this invention is to provide an air-cooled electric furnace with improved maintenance characteristics.

Another object of this invention is to provide an improved electric furnace with a transverse refiner section which is likewise air cooled and which therefore also is subject to reduced maintenance requirements.

A further object of this invention is to provide a new and improved method and apparatus by which molten glass is metered from the furnace refiner section.

Another object of this invention is to provide new and improved glass sheet formation apparatus and methods.

A further object of this invention is to provide a new method and apparatus for cutting glass sheets.

Another object of this invention is to provide a novel method and apparatus for cutting glass sheets while the newly-formed sheets are still in a semi-molten state.

Another object of this invention is to provide a novel glass cutting method and apparatus by which the glass is cut before it is temperature treated in subsequent tempering or annealing stages.

A further object of this invention is to provide a new glass cutting apparatus by which a newly-formed glass sheet can be automatically cut into a plurality of smaller predetermined sizes with a high degree of precision.

Another object of this invention is the provide a novel method and apparatus for transferring and tempering newly-formed glass sheets.

A further object of this invention is to provide a new and improved casing which houses the plurality of electrodes employed in the electric furance.

Another object of this invention is to provide a novel glass manufacturing apparatus and method which requires a minimum number of human operators, and which is controlled from a central control center.

These and other objects of the present invention are achieved by providing an all-electric glass manufacturing process and apparatus having a vertical air-cooled electric furnace and a transverse air-cooled refiner section. The furnace and the refiner are provided with a plurality of molybdenum electrode cartridges housed in lock-in cartridge casings designed to facilitate electrode removal. Molten glass is removed from the furnace refiner section by means of a plurality of basin cylinders symmetrically disposed within the transverse refiner. The basin cylinders are provided with a plurality of open faces which receive molten glass from the furnace refiner and which upon rotation of the basin cylinder delivers a prescribed amount of molten glass to an extruder mechanism. The extruder mechanism accepts molten glass from the basin cylinder and applies the molten glass to a pair of extrusion rolls. The extrusion rolls are eccentrically pivoted off-center such that the separation distance between them can be varied in accordance with the desired thickness of the sheet glass being formed. The entire extruding mechanism including the extruder rolls is mobile such that as molten glass is extruded through the extruder rolls it is deposited on a molten tin bath which imparts an ideal smoothness to the surface of the newly-formed glass sheet. A cutting frame is then lowered over the tin bath such that the molten glass sheet is held firmly between a flange on the cutting frame and a flange on the tin bath. Thereafter, the molten glass sheet is cut into lite sizes by a cutting mechanism having a plurality of discrete glass cutting block assemblies, each of which is independently adjustable to a resolution of 1/32 inch. These cutting block assemblies are housed in two cutting carriages which alternately sweep the length and width of the newly formed glass sheet while the sheet is stationary on the tin bath. After cutting, a transfer unit having a plurality of suction orifices connected to a reversible vacuum source is lowered over the glass sheet. The transfer unit lifts the newly cut glass sheet off the tin bath and transfers the glass sheet either to an annealing stage or to a tempering stage. Notably, the transfer unit is also used for tempering, with the reversible vacuum source applying cold air to the glass sheet. After temperature treatment, the glass sheet cut to lite sizes undergoes electronic inspection and packaging. The entire process is under the control of a minimum of operator personnel located in a central control center.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 3a and 3b are top and side views respectively of the air-cooled vertical electric furnace of the present invention, FIG. 4 is a side view of an electrode assembly mounted in the furnace wall, FIGS. 11a and 11b are end and top views respectively of the glass cutting block assembly, FIGS. 11c and d are bottom and side views respectively of the cutting block retraction ratchet gear with associated retraction elements, FIGS. 14a and 14b are end and side views respectively of the tempering chamber of the present invention.

DESCRIPTION OF THE PREFERRED EMBODIMENTS

Figure 1:
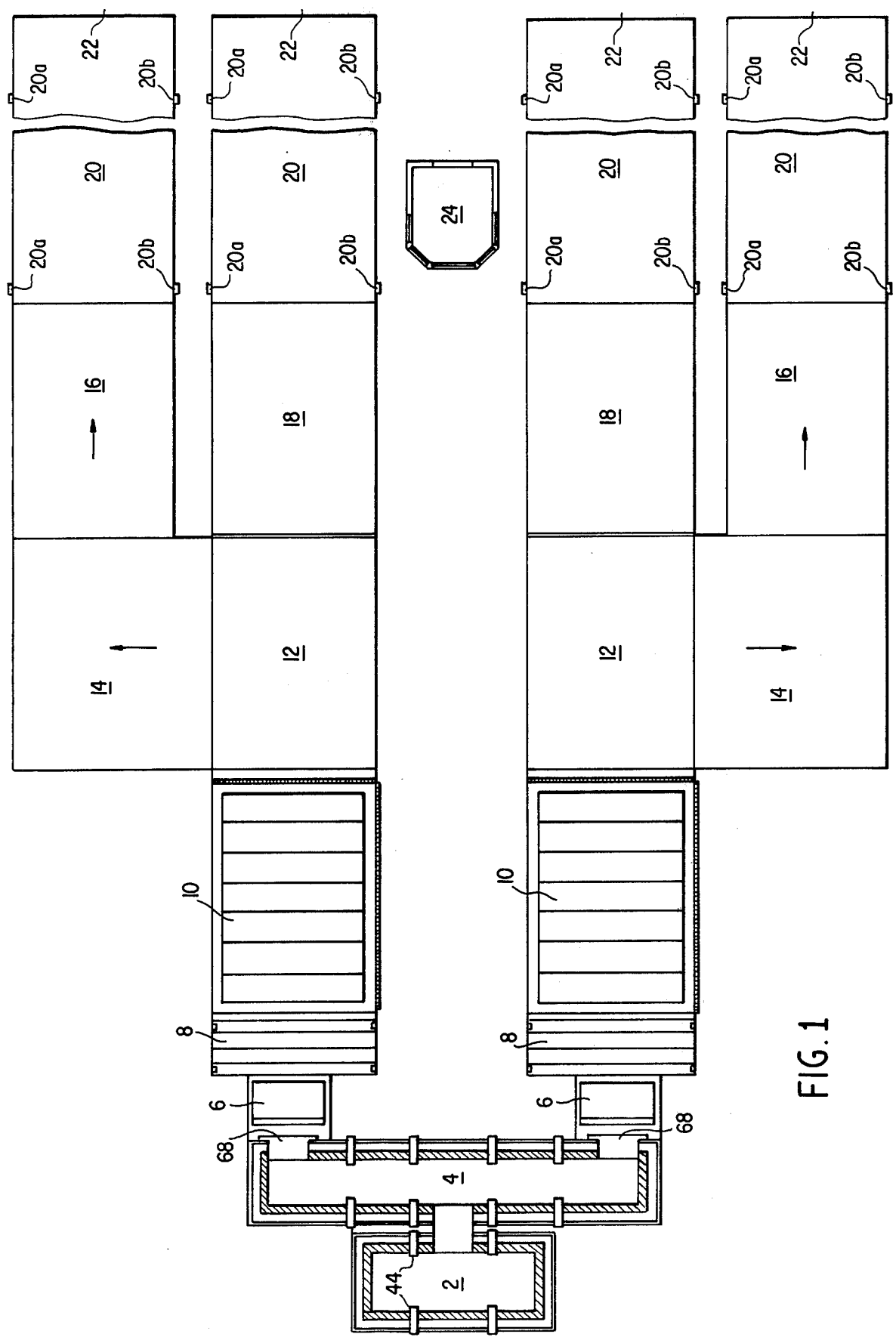
FIG. 1 is a top view of the glass manufacturing apparatus of the present invention.
Figure 2:
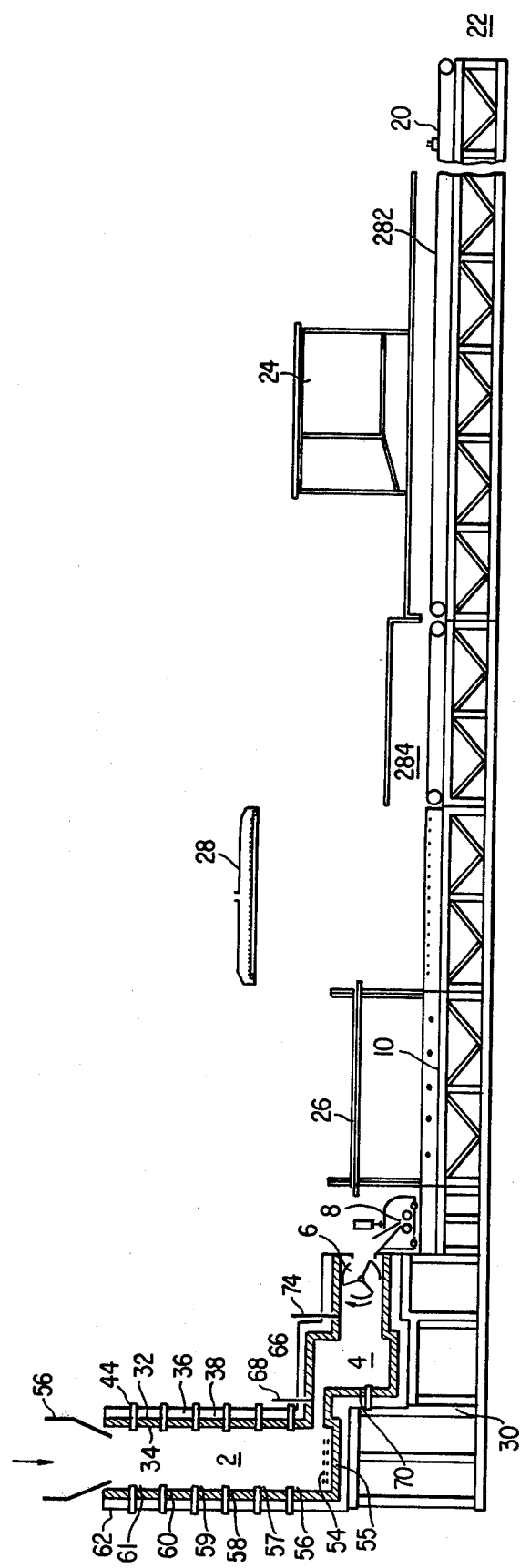
FIG. 2 is a side view of the glass manufacturing apparatus of the present invention.

Referring now to the drawings, wherein like reference numerals designate identical or corresponding parts throughout the several views, and more particularly to FIG. 1 thereof, there is provided an overview of the glass manufacturing apparatus of the present invention which includes the vertical air cooled electric furnace 2, the transverse air cooled furnace refiner 4, the glass metering basin cylinders 6, the glass extruder mechanisms 8, molten tin baths 10, tempering chambers 12, glass sheet transfer area 14, tempering lehrs 16, annealing lehrs 18, packaging areas 22, and control center 24. Many of these component parts of the glass manufacturing apparatus of this invention are also shown in FIG. 2 in which the glass cutting frame 26 and the mobile transfer and tempering unit 28 is viewed. As shown in FIG. 2, the glass manufacturing parts listed above are supported on a steel structure 30.

The operation and structure of the vertical air cooled electric furnace with its transverse air cooled refiner section is now described with reference to FIGS. 1-3. As seen in these figures, the walls 32 of the electric furnace 2 are provided with an inside lining 34 made of refractory brick. Surrounding the refractory brick lining 34 is steel frame 36 which provides mechanical support to the vertical furnace 2 and which in effect contains the furnace 2. Steel frame 36 consists of inner and outer steel plate linings 38. Steel separators 40 are provided between steel plate linings 38 thereby forming air cooling passageways 42 between steel plate linings 38. A plurality of molybdenum plate electrodes 44 are provided as circuit pairs at various levels of vertical furnace 2 and transverse refiner 4. Removable preheating electrodes 54 which are used during furnace start-up conditions are located just above the floor 55 of vertical furnace 2. Also provided near the floor 48 of furnace 2, but not shown, is a cullet drain and a sediment sump.

Molybdenum electrodes 44 are selected as the primary glass heating elements because of their relatively large glass contact areas. This reduces current density in the vicinity of the electrode, and thus results in greater resistance to erosion. The electrodes 44 exhibit a relatively long service life, thereby minimizing furnace maintenance requirements.

Each electrode 44 is assembled in cartridge form. Each cartridge assembly as shown in FIG. 4a consists of a molybdenum electrode plate 45, a rigid conductor 46 connected to the electrode plate 45 at one end and provided with a connector terminal 47 at the other end thereof, and an insulation lining 48 which surrounds the rigid conductor 46 and fits flush between the electrode plate 45 and the terminal 47. The insulation lining 48, made of a ceramics material, mechanically protects the plate 45 and conductor 46 during handling, while electrically and thermally isolating the electrode assembly 44 from the furnace structure.

As shown in detail in FIG. 4, each electrode cartridge assembly 44 is housed in an electrode casing 49 which protrudes through furnace wall 32. Electrode cartridge 44 is inserted in casing 49 with its molybdenum plate protruding within the furnace. Since electrode 44 is tight fitting within casing 49, molten glass is prevented from lodging or seeping between the cartridge 44 and the casing 49. Electrode casing 49 is tubular in shape, with an opening at one end 41 in communication with the interior of the electric furnace 2. The other end 43 of the tubular casing 45 is provided with an electrode cartridge lock-in mechanism, which consists of lock-in doors 50 hingedly connected to the end 43 of casing 49. The lock mechanism also features a pair of latching hooks 51a on either side of the lock-in doors 50, and a latch catch 51b which engages each latch hook 50a, thereby locking the doors and maintaining furnace electrode 44 in proper position during furnace operation. Furthermore, each electrode cartridge casing 49 is also provided with a casing cutoff 52 which prevents molten glass escape during electrode replacement. The casing cutoff 52 is manually operable by means of the two way ratched cutoff lifting mechanism 53. Also, as seen in FIG. 4, electrode casing 49 is in communication with air cooling passageway 42. This factor in combination with the insulation lining 48 prevents excessive localized heating in the furnace walls in the vicinity of the electrode assemblies and thus improves the service life of the furnace structure which in turn minimizes system down time. Furthermore, electrode cartridge replacement is effected on line, without system down time, thereby further enhancing system utilization.

During furnace start-up, removable electric resistance preheating electrodes 54 are inserted inside the vertical furnace 2 through the furnace walls 32 just above the furnace floor 55. Raw glass batch material is then gently lowered into the furnace by means of portable furnace intake chute 56, shown in FIG. 2, to a level 56 just below the first set of molybdenum plate electrodes. Preheating electrodes 46 are then energized, thus melting the initial batch materials in vertical furnace 2. Thereafter, additional batch material is successively entered into the furnace via chute 56 to levels 57–62 whereupon each opposed pair of molybdenum electrodes just below these levels are successively and respectively energized by applying 220 volt 60 cycle electrical power across each electrode pair. Electric current then flows between each electrode pair, thus resulting in heating and melting of the glass batch materials between each electrode pair. It is noted that the relatively large surface area of each molybdenum plate 45 decreases the current density in the immediate vicinity of the plate 45, thereby decreasing erosion of the electrode plate 45. Removable preheating electrode 46 are withdrawn from the furnace 2 upon completion of the start-up cycle.

As shown in FIG. 2, electric furnace 2 communicates with transverse refiner section 4 via furnace throat section 66 which forms a passageway for the flow of molten glass from the furnace 2 to the refiner 4. When the prescribed melting temperature is obtained in the furnace 2, throat cut-off 68 is opened to allow molten glass flow to the preheated transverse refiner 4. Thereafter, proper glass levels are maintained within the vertical furnace 2 and the transverse refiner 4 by adding new raw batch materials to the vertical furnace 2 in equal proportion to the molten glass withdrawn from the vertical furnace 2 into the refiner 4 via throat 66. Molybdenum electrode cartridges 44 are also provided in the transverse refiner 4 at level 70 in order to maintain the required molten glass temperature. It is noted that while the vertical electric furnace temperature is maintained at approximately 2600° to 2900° F., the transverse refiner temperature is maintained in the range of 1800° to 2200° F.

Figure 5:
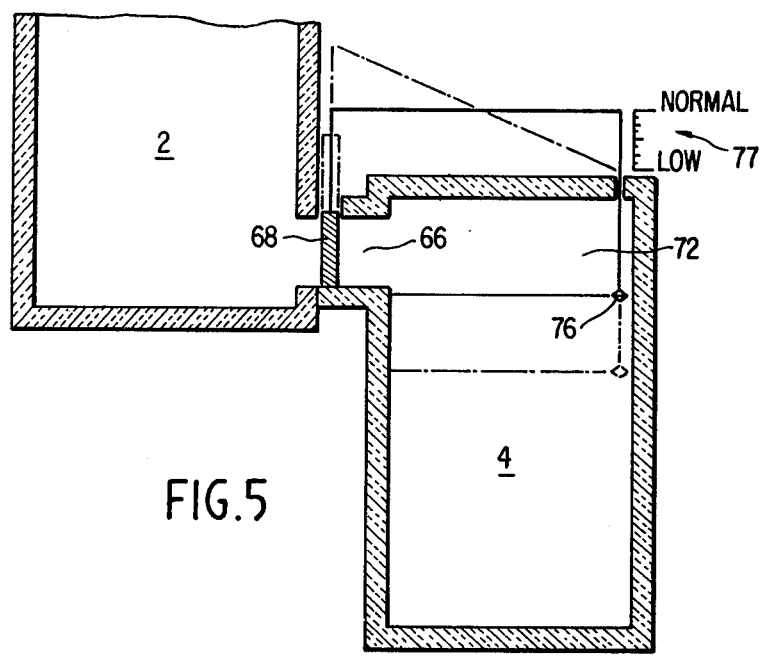
FIG. 5 is a side view of the transverse refiner section of the electric furnace and includes a schematical representation of the refiner glass level control mechanism.

Molten glass level in the transverse refiner section is maintained at a prescribed level 72 within the refiner 4 by means of throat cut-off 68. As shown in FIG. 5, the transverse refiner molten glass is maintained at a prescribed level 72 by means of a float device 76. This float device 76 floats on the surface of the molten glass within the transverse refiner 4, and rises or falls in accordance with this level. The vertical position of the float device 76 is monitored external to the refiner 4 by float position indicator 77. Indicator 77 generates an electrical feedback signal to throat cut-off 68, which is then raised or lowered to maintain the prescribed refiner glass level 72. Indicator 77 also generates an electrical signal representative of the actual refiner glass level, and this signal is displayed in the control center 24. The refiner glass level control mechanism shown in FIG. 5 assures a prescribed glass level at 72, and therefore avoids molten glass flooding or a highly pressurized glass flow which might otherwise occur in the absence of refiner glass level controls. This prescribed refiner glass level 72 is established by the human operator in control center 24, and can be varied according to the characteristics of the particular glass melt within the refiner 4.

Figure 6:
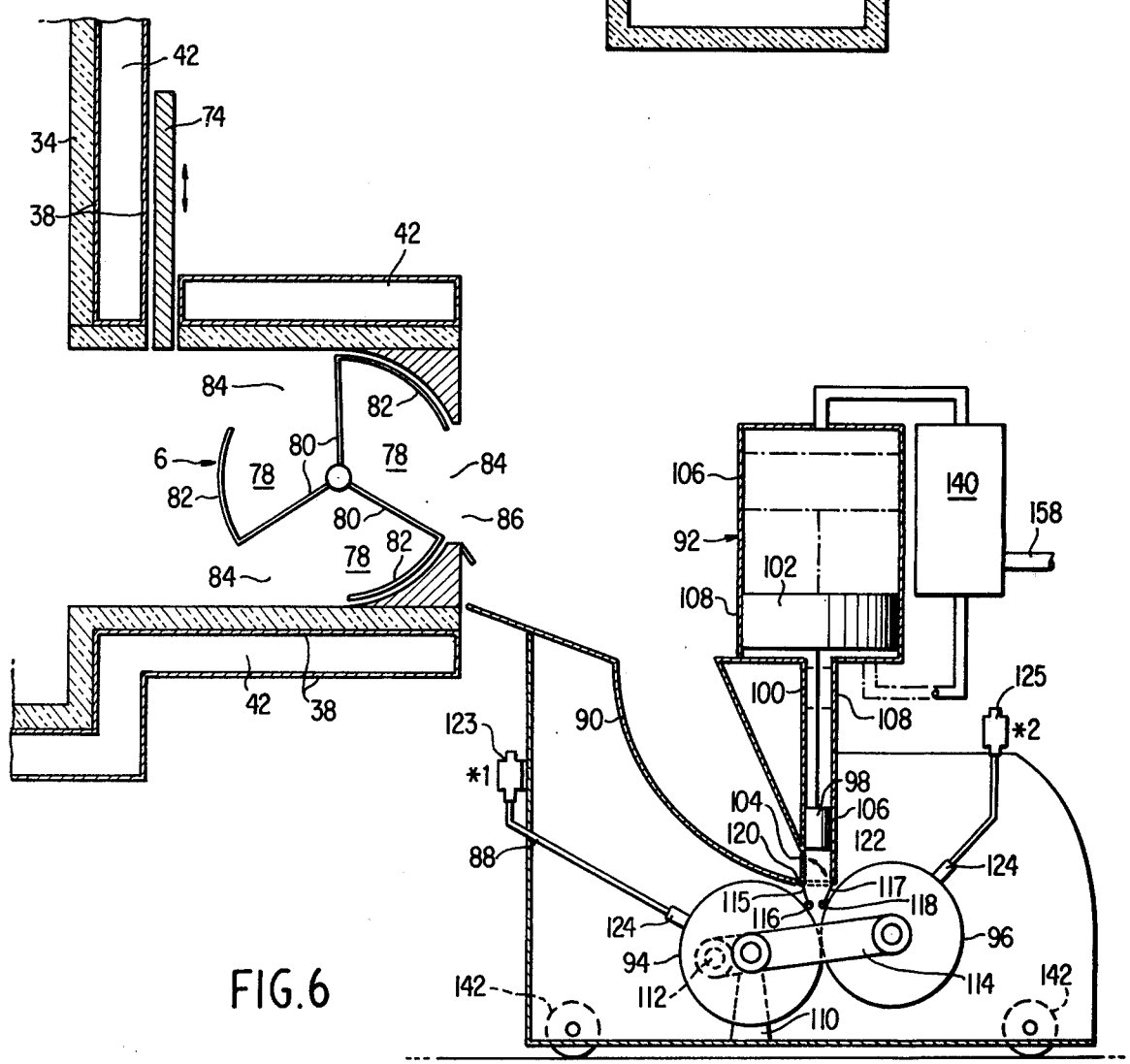
FIG. 6 is a side view of a glass sheet forming apparatus, including a rotating basin cylinder located in the transverse refiner of the electric furnace, and the glass extruder apparatus of the present invention.

Glass of a particular sheet thickness as selected by the operator in control center 24 is produced by means of the apparatus shown in FIG. 6. As seen in FIG. 6, this apparatus includes the basin cylinder 6 and the glass extruder 8. As seen in FIGS. 1 and 6, a pair of basin cylinders are located at either end of the furnace transverse refiner section 4. The basin cylinder is of cylindrical shape and is partitioned into three equally dimensioned molten glass dispensing chambers 78. Chambers 78 are separated by three radially extending partitioning fins 80 which are connected at the center of the basin cylinder and extend the entire length of the basin cylinder. Radial fins 80 form 120° angles between adjacent fins. Connected to partitioning fins 80 and extending the length of the basin cylinder are molten glass catching pieces 82 which form 60° arcs around the circumference of basin cylinder 6. As seen in FIG. 6, the basin cylinder glass dispensing chamber 78 is formed by partitioning fins 80 and glass catching pieces 82. Each dispensing chamber 78 is provided with an open face 84. As the basin cylinder 6 is rotated, molten glass enters the open face 84 of the plural glass dispensing chamber 78, thereby forming a glass glob charge which exits the transverse refiner 4 and the basin cylinder 6 through the refiner exit 86.

As shown in FIG. 6, metered glass globs are delivered from the basin cylinder 6 to the mobile extruder carriage 88. The extruder carriage 88 houses the extruder mechanisms 8 shown in FIG. 1. These mechanisms include a glass glob storage chute 90, a glass extruder device 92, and glass sheet rollers 94 and 96. The extruder device 92 includes an extrusion bar 98, which travels in the extrusion bar chamber 100; extrusion pistons 102 attached to the extrusion bar 98 by means of rigid rods 101; and a hinged molten glass intake valve which admits molten glass from the glass glob storage chute 90 to the extrusion bar chamber 100.

The operation of the extruder mechanisms 8 is now described. A prescribed amount of molten glass, as determined by the number of revolutions of the basin cylinder 6, is delivered to the glass glob storage chute 90. Hinged intake valve 104 is in its vertical position as the prescribed amount of molten glass is metered into the storage chute 90 by the multiple clockwise revolutions of the basin cylinder 6. Basin cylinder 6 is halted upon the prescribed number of revolutions, and hinged intake valve 104 is then placed in its open, horizontal position. Thereupon the extruder intake stroke is commenced, whereby the extruder bar 98 is raised from its lower position 106 to its upper position 108. The molten glass charge stored in chute 90 is then drawn by suction into the extrusion bar chamber 100. Upon completion of the extruder intake stroke, hinged valve 104 is closed to its vertical position, and the extruder device 92 commences its extrusion stroke. During the extrusion stroke, the extrusion bar is lowered from its upper position 108 to its lower position 106 thereby forcing the glass charge between glass sheet rollers 94 and 96. As seen in FIG. 6, roller 94 is mounted on the extruder carriage 88 by means of roller support beam 110. On the other hand, glass sheet roller 96 is eccentrically pivoted with respect to roller 94 at pivot point 112 by means of pivot support arm 114. As a result, when roller 96 is raised or lowered, the distance separating rollers 94 and 96 narrows or widens in accordance with the arc traveled by support arm 114. In this way, the thickness of the extruded glass is precisely maintained. Once again referring to FIG. 6, the molten glass charge is forced from the extrusion bar chamber 100 between rollers 94 and 96 during the extrusion stroke of the extruder device 92. Hinged flexible sleeve roll seals 115 and 117 contact the rollers 94 and 96 at points 116 and 118 respectively and prevent pressure escape during extrusion. Seals 115 and 117 are respectively connected to glass glob storage chute 90 at point 120 and extruder bar chamber 100 at point 122. Also, swab paste applicators 124 are installed on the extrusion rollers 94 and 96 in order to prevent surface marring of glass sheet as a result of contact with the metal rollers 94 and 96. The paste applied by swab paste applicator 124 is a semi-liquid high temperature resistant substance commonly used in the glass container industry as a lining between the newly formed glass sheet and the metal rollers 94 and 96. The applicators 124, which delivers a constant light supply of swab paste to the extruder rollers 94 and 96, contact the entire length of these rollers. The swab paste is composed of liquid graphite in an inorganic binder, e.g., magnesium silicate, asphalt, thermoplastic resin, etc. Examples of trade names for the paste are "No-Swab" and "End-O-Swab".

The swab paste applicators consist of multiple bristles brush (similar to the common paint brush) extending 3 or 4 inches from the edge of a metal binder. The applicators 124 are 3 to 4 inches in width and no less than 84 inches in length. The applicator brushes 124 are shown contacting the extrusion rolls 94 and 96 in FIG. 6.

The material composition of the bristles or mats must withstand temperatures near 1500° F. without flaking or crumbling which would impart a defect into the glass sheet. Graphite fibers and fabrics or fiberglass textiles would therefore adequately serve as bristles for the paste applicators.

An accessible container and conduit for continuous paste supply to each applicator is viewed in FIG. 6, and labeled as 123 and 125 respectively. The section of conduit lying horizontally above and the length of the applicators has spaced orifices below of sufficient diameter to allow passage of paste for constant saturation of the applicator brushes. Conceivably, the viscosity of the paste would be selected to allow gravity flow from the containers.

Figure 7:
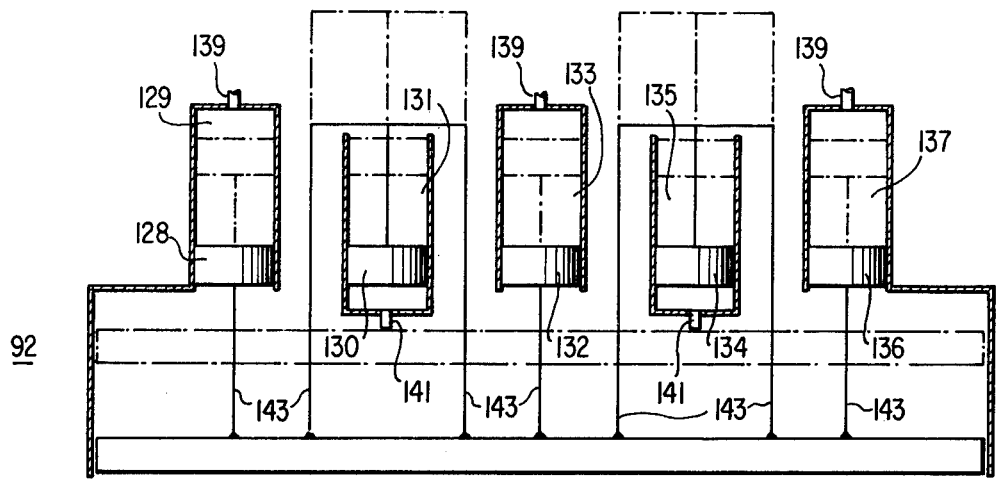
FIG. 7 is a side view of the extrusion cylinders and the extrusion bar of the extrusion mechanism viewed in FIG. 6.

As shown in FIG. 7, the extruder device 92 employs five compressed air operated pistons 128, 130, 132, 134, and 136, respectively housed in piston chambers 129, 131, 133, 135, and 137. Pistons 128 and 132 and 136 generate the extrusion stroke. Accordingly the respective chambers 129, 133 and 137 of pistons 128, 132 and 136 communicate with a compressed air reservoir 140 by means of openings 139 located at the top of these piston chambers. Correspondingly, pistons 130 and 134, generate the intake stroke of extruder device 92, and the respective piston chambers 131 and 135 therefore communicate with compressed air reservoir 140 by means of openings 141 located at the bottom of piston chambers 131 and 135.

During the intake stroke of extruder device 92, a conventional valve (not shown) is opened, and compressed air enters chambers 131 and 135 via openings 141. Compressed air pressure then forces pistons 130 and 134, and extrusion bar 98 rigidly attached to these pistons by means of connecting rods 143, upwardly. The resultant suction creased by the upward movement of extrusion bar causes molten glass to be sucked into the extrusion bar chamber 100.

During the extrusion stroke, a conventional valve (not shown) is opened to allow compressed air from reservoir 140 to apply pressure to the top 141 of pistons 128, 132 and 136. This pressure forces these pistons and the extrusion bar rigidly attached to these pistons downwardly, thereby resulting in the extrusion of molten glass from extrusion bar chamber 100 to the glass sheet rollers 94 and 96. During the extrusion stroke, compressed air previously forced into intake piston chambers 131 and 135 is returned to compressed air reservoir 140 for replenishment thereof. Likewise, during the intake stroke compressed air previously forced into chambers 129, 133 and 137 is also returned to the reservoir 140, thereby maintaining the compressed state of the air within the reservoir 140.

Figure 8:
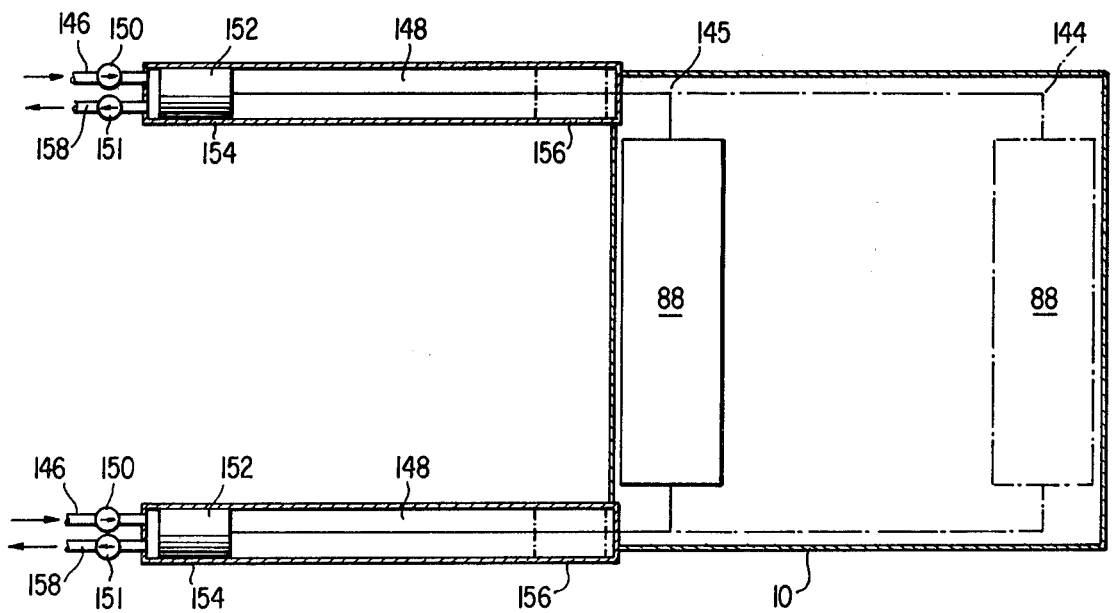
FIG. 8 is a schematical representation of the air compression apparatus of the extruder mechanism.

Glass sheet formation is now further described with the air of FIGS. 3, 6 and 8. Referring to FIG. 6, it is seen that the mobile extruder carriage 88 is mounted on wheels 142. Extruder carriage wheels 142 mate with tracks (not shown) along the length of the molten bath 10. During the extruder molten glass intake stroke, the extruder carriage 88 is transported from its loading position 145 underneath the basin cylinder 6 to the far end 144 of the tin bath 10, as shown in FIG. 8. Upon completion of the extruder intake stroke, the extruder device 92 commences its extrusion stroke during which time the extruder carriage 88 is returned to its loading position 145. As the extruder carriage travels from points 144 to 145 the glass sheet is extruded through rollers 94 and 96 and laid directly upon the tin bath 10.

Referring now to FIGS. 3 and 8, the derivation of compressed air in the compressed air reservoir 140 is now described. As seen in these FIGURES, air heated in the furnace air cooling passageways 42 is channeled through hot air pipes 146 to air compression cylinders 148 via non-reversible valves 150. Located within air compression cylinders 148 and travelling the length of these cylinders are air compression pistons 152. As the extruder device 92 travels from position 145 to position 144, air compression pistons 152 likewise move from positions 154 to 156 as shown in FIG. 8. During the return of extruder carriage 88 from point 144 to point 142, air compression cylinder 148 undergoes its compression cycle as piston 152 returns to position 154 from position 156. During the compression cycle, non-reversible valves 150 are closed, and a second pair of non-reversible valves 151 are opened to admit air to compressed air reservoir 140 via pipe 158. As discussed above, the compressed air reservoir 140 is the compressed air source for the extruder device 92 shown in FIG. 6. By using hot air from the electric furnace air-cooling passageways 40 as the extruder driving force during the molten glass extrusion process, it is assured that the molten glass being extruded remains in its molten state.

Figure 9B:
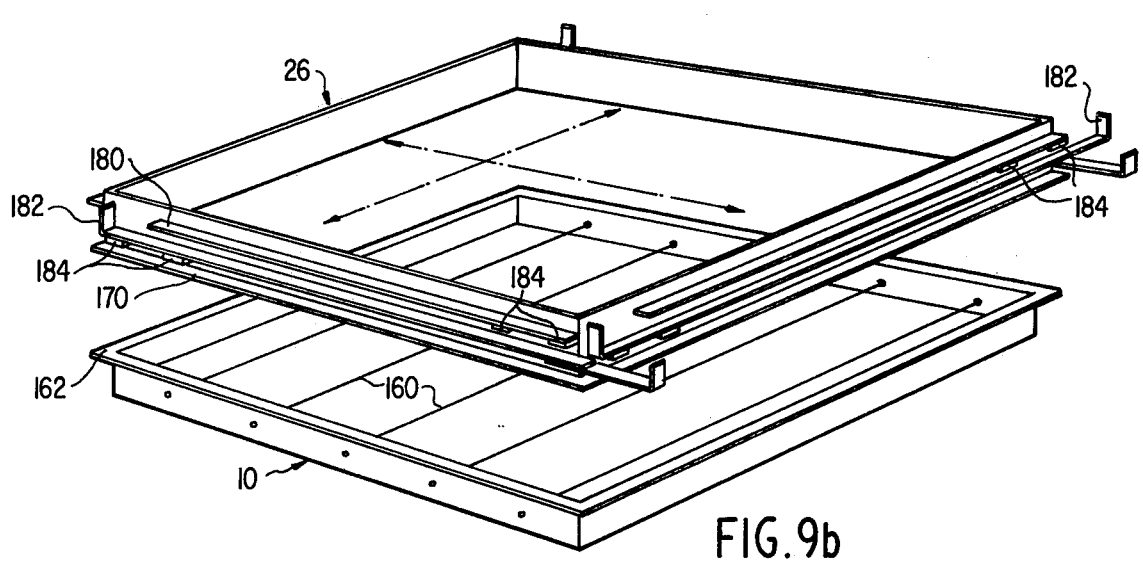
FIG. 9b is a view of the cutting frame in relation to the tin bath on which the glass sheet is formed.
Figure 10A:
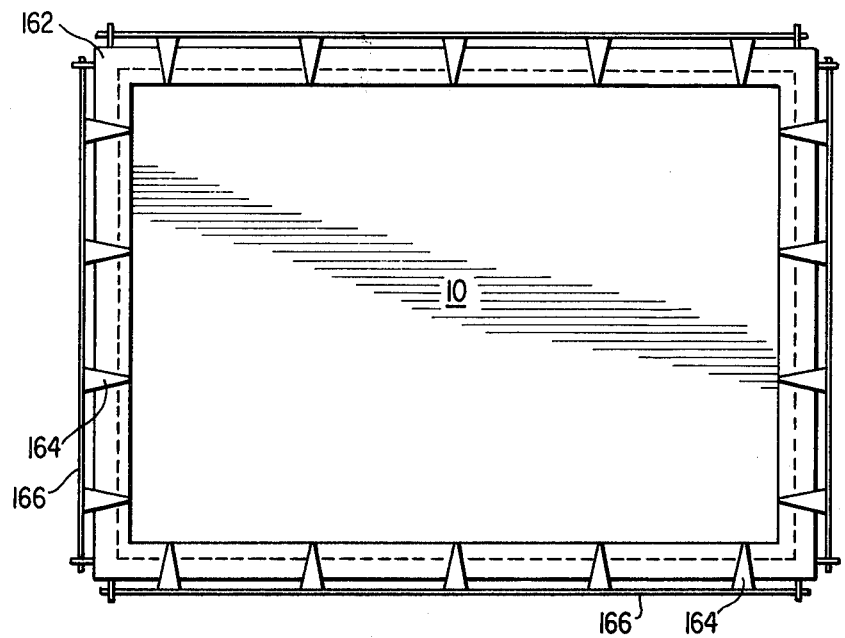
FIGS. 10a and 10b are top and side views respectively of a marginal glass strip rejection mechanism.
Figure 10B:
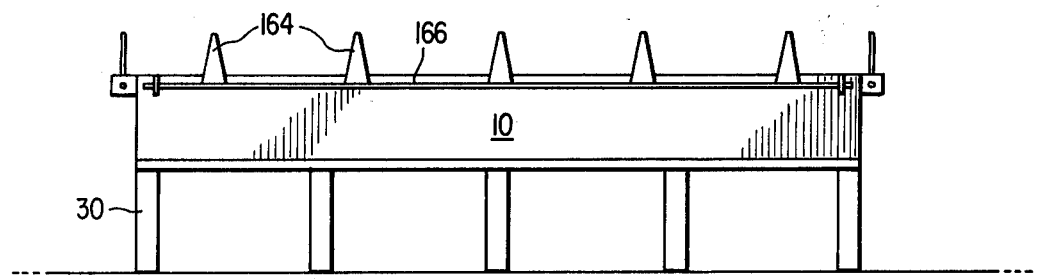

As discussed above, the newly formed molten glass sheet, having been extruded and compressed by rollers 94 and 96 is laid on the molten tin bath 10 during the extrusion stroke of the extruder device 92. The molten tin bath 10 is viewed in detail in FIGS. 9b and 10. Electric heating rods 160 traverse the bath 10 and apply constant melting temperatures to the tin contained therein. An external flange 162 forms a lip at the upper periphery of the tin bath 10 and provides a narrow flat surface upon which the extruded molten glass sheet extends. As shown in FIG. 10, also provided around the periphery of the tin bath 10 are marginal strip rejection forks 164 which are precisely fitted within recesses contained in external flange 162. Rejection forks 164 are pivoted on bars 166 which when rotated likewise cause rotation of rejection forks 164. Upon completion of the glass cutting step, discussed hereinafter in detail, rejection forks 164 are raised vertically as shown in FIG. 10b by the rotation of bars 162, thereby returning to cullet scrap glass extruded upon external flange 162.

Returning now to FIG. 9, the glass cutting frame 168 of the present invention, and its relationship to tin bath 10 is shown in detail. As seen in FIG. 9b, the glass cutting frame 26 is provided with a base flange 170 which together with the tin bath external flange 162 firmly holds the extruded molten sheet when the cutting frame 26 is lowered on the tin bath 10. In this way, the molten glass sheet is immobilized during the glass sheet cutting phase described hereinafter. The two-way glass sheet cutting is performed by cutting carriages 172 and 174 which respectively and alternately traverse the width and the length of the tin bath 10 during the cutting operation. Cutting carriages 172 and 174 are provided with two-way cutting tracks 176 and 178, respectively, on the cutting frame. Each of the cutting tracks 172 and 174 are provided with upper and lower track levels 180 and 182 respectively. Lower cutting track 182 is used during the cutting sweep of the cutting carriages, while the upper cutting track 180 is used by the cutting carriages during the return travel. In this way, the cutting blades, which are lowered for the cutting operation as discussed hereinafter, are prevented from dragging through the previously cut semi-molten glass sheet during the carriage return sweep. Cutting carriages 172 and 174 are raised and lowered from the upper and lower cutting track levels 180 and 182 of cutting tracks 172 and 174 by conventional means (not shown). Furthermore, as shown in FIG. 9c switches 184 which are either opto-electrical devices or contact type devices, are provided at various points on the cutting tracks 176 and 178. Switches 184 signal the completion of the cutting sweeps of the cutting carriages 172 and 174, and initiate the raising and lowering of the cutting carriages 172 and 184.

In another possible embodiment, the upper and lower track levels 180 and 182 can be replaced with a single track level which is raised and/or lowered as a cutting carriage begins and/or finishes a traverse of the tin bath 10. In this other embodiment, a camming mechanism can be employed to actuate the lifting of the single cutting track.

Figure 9A:
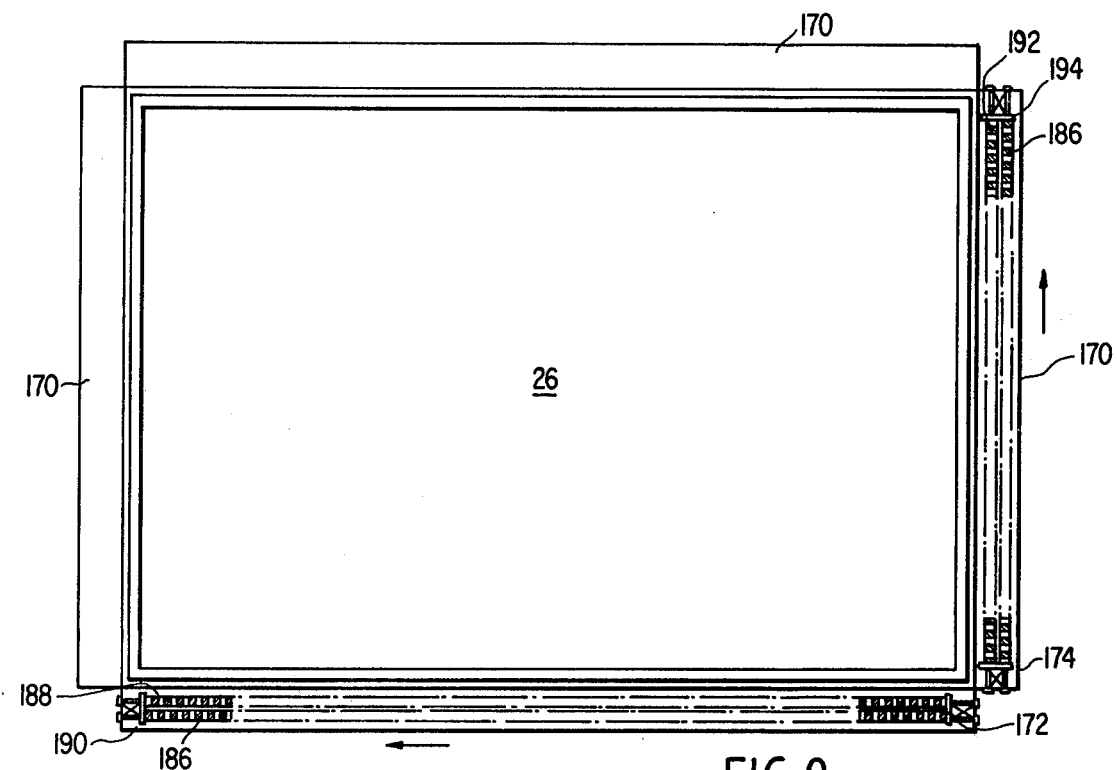
FIG. 9a is a top view of the cutting mechanism of the present invention.
Figure 9C:
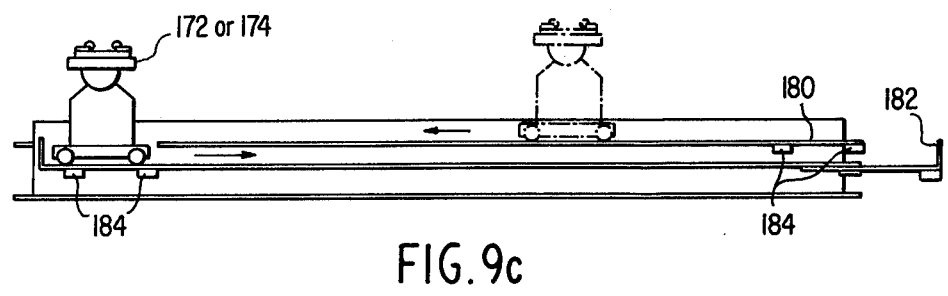
FIG. 9c is a view of a cutting carriage in relation to the cutting frame.

As seen in FIG. 9a, the cutting carriages 172 and 174 each house a plurality of individual cutting block assemblies 186. Each of the cutting block assemblies 186 is independently operable, as selected by the operator in the control center 24. As presently envisioned, cutting carriage 172 is provided with 120 of the cutting block assemblies 186, which are arranged in two rows, front and back, 188 and 190 respectively. Likewise, cutting carriage 174 is provided with 84 individual cutting block assemblies 186, which are arranged in front and back rows 192 and 194 respectively. As seen in FIG. 9a, an equal number of cutting block assemblies 186 are located in the front and back rows of the cutting carriages 172. Each cutting block assembly 186 is two inches wide, with one inch thereof being occupied by a cutting block 196. Cutting block assemblies in the front and back rows 188 and 190 of cutting carriage 182 are offset one inch with respect to each other as shown in FIG. 12 such that for every linear inch of the length of the cutting carriage 172, one cutting block 196 is provided. In like fashion, the cutting block assemblies 186 of cutting carriage 174 are similarly arranged. As discussed below, the one inch separation between adjacent cutting blocks 196 in the same row of cutting carriages 172 and 174 is necessary to provide for the fractional movement to 1/32 of an inch of each cutting block 196.

Figure 11A:
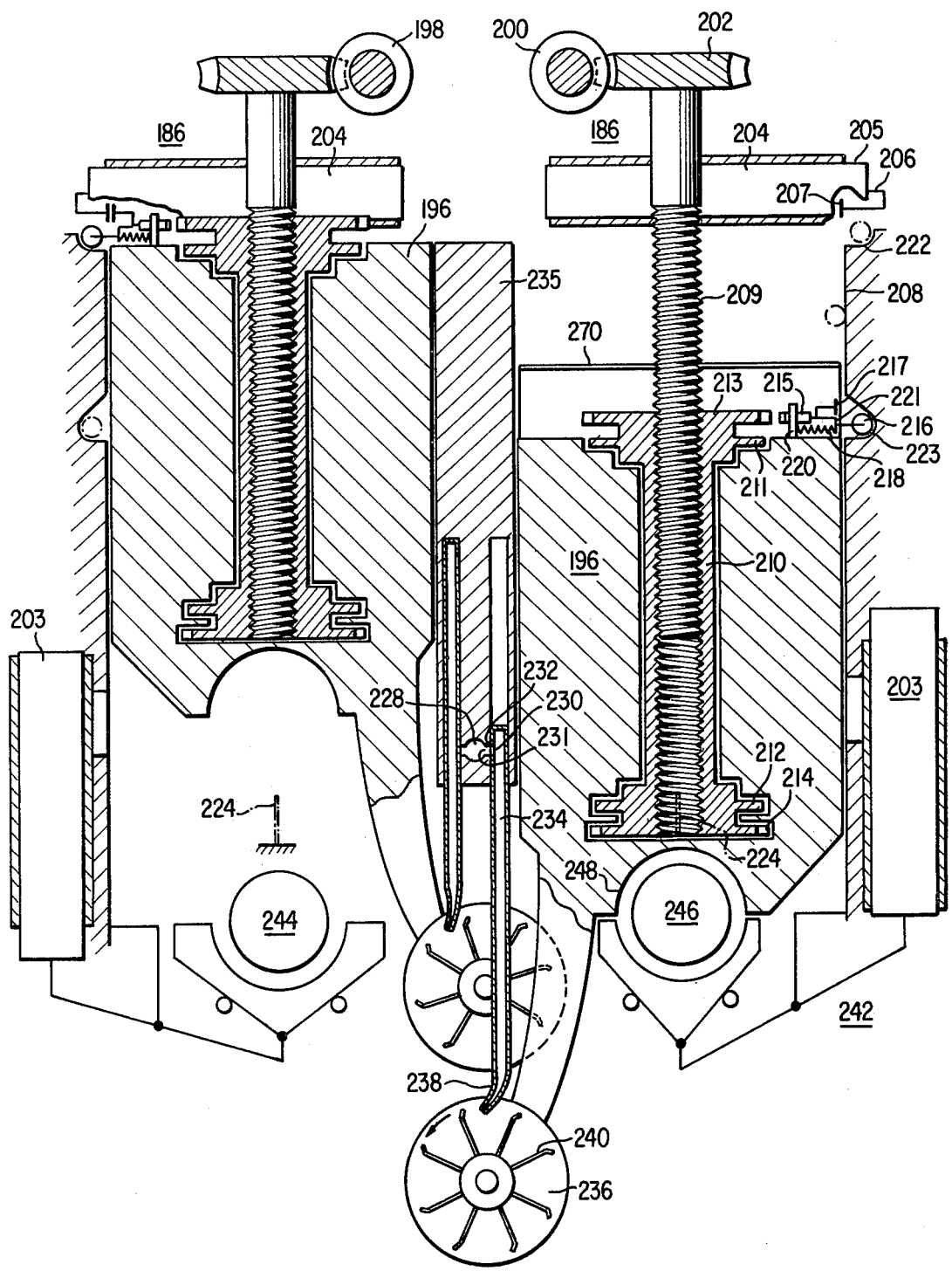
Figure 13:
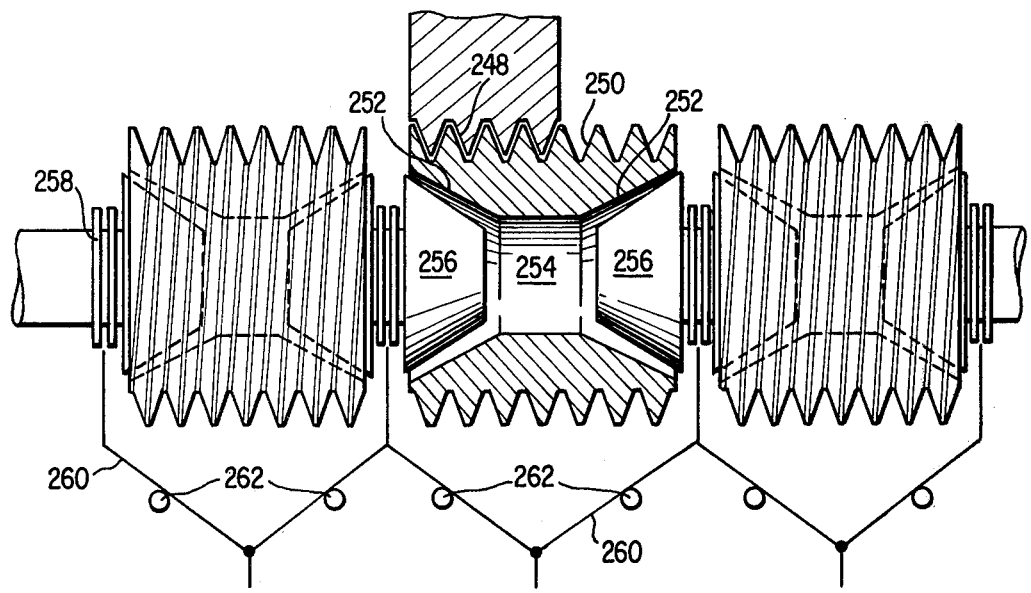
FIG. 13 is a view of the fractional movement mechanism with which each cutting block assembly is provided.

Referring now to FIGS. 11 and 13, the operation of the cutting block assembly 186 is presently described. FIG. 11a is an end view of two cutting block assemblies 186 which are respectively located in the front and back rows of a cutting carriage 172. Each cutting carriage 172 or 174 is provided with a pair of shafts 198 and 200 having worm gear segments that mesh with gears 202 of each cutting block assembly 186. Worm gear shafts 198 and 200 extend the entire length of the cutting carriage 172, with shaft 198 being dedicated to the front row of cutting block assemblies, and with shaft 200 being dedicated to the rear row of cutting block assemblies.

Each cutting block assembly 186 is also provided with a pair of solenoids 203 and 204 which respectively control the vertical and fractional movement of the cutting block 196. The solenoids 203 and 204 are of identical and conventional design, each having an armature 205 which is movable upon electrical energization of the solenoid coil (not shown), and thus converting electrical impulse into mechanical action. The armature 205 of the vertical movement solenoid 203 is connected by means of a linkage mechanism 206 to an armature linkage pad 207. As discussed hereinafter, the vertical movement solenoid 203 in concert with the operation of the solenoid armature 205, the armature linkage 206 and the armature linkage pad 207 initiate vertical movement of the cutting block 196.

Each cutting block assembly 186 is provided with a cutting block cell 208, made of thin sheet metal, which houses the cutting block 196 and associated cutting block assembly components. These components include a threaded gear shaft 209 appending from the gear 202, and a threaded shaft sleeve 210 which surrounds and threadedly engages at least a portion of the gear shaft 209. Upper and lower sleeve flanges, 211 and 212 respectively, are provided as an integral part of the shaft sleeve 210, with the cutting block 196 retained between the upper and lower flanges 211 and 212. The upper and lower flanges 211 and 212 respectively are provided with a vertical movement gear 213, shown in FIGS. 11a and 11b, and a ratchet return gear 214 shown in FIGS. 11a and 11c. Also associated with the cutting block cell 208 is the plunger 215, the plunger roller 216, the plunger contact pad 217, and the plunger expansion spring 218.

At the outset of a cutting operation, the worm gear shafts 198 and 200 commence rotation. Therefore, the gears 202 with their companion threaded gear shafts 209 likewise commence rotation. The shaft sleeve 210 in threaded engagement with the shaft 209 at this time has a "floating" association with the shaft 209 and commences rotation in the direction of the shaft 209 as long as rotational freedom of the sleeve 210 is unimpeded. However, upon selection of a particular cutting block assembly 186 for service, the associated solenoid 203 is energized, which results in movement of the solenoid armature 205, the armature linkage 206, and the armature linkage pad 207 from the "released" position (broken line) to the "activated" position (solid line) shown in FIG. 11b. Thereupon the armature linkage pad 207 contacts the plunger pad 217, and pushes the pointed edge 219 of the plunger 215 into engagement with the teeth of the vertical movement gear 213, thereby terminating rotational freedom of movement of the shaft sleeve 210 on the threaded gear shaft 209. As a result, the shaft sleeve 210 proceeds to move up or down on the threaded gear shaft 209, depending upon the direction of rotation of the worm gears 198 or 200. Naturally, as the sleeve 210 descends, so does the cutting block 196 which is in effect clasped between the flanges 211 and 212 attached to the sleeve 210.

During descent of the cutting block 196, the plunger 215 likewise descends, since the plunger 215 is retained in a plunger support 220 attached to the cutting block 196. It is noted that the plunger roller 216 connected to the plunger 215 by means of the plunger linkage 221 was pushed off a lip 222 of the cutting block cell 208 under the action of the contact pads 207 and 217. As the cutting block 196, and therefore the plunger 215 descend, the contact pads 207 and 217 disengage, and the roller 216 contacts the inner wall of the cutting block cell 208. The plunger 215 is maintained in engagement with the vertical movement gear 213 during descent until the plunger roller 216 encounters a recess 223 in the walls of the cutting block cell 208. Thereupon the expansion spring 218 forces the plunger roller 216 into the recess 223, while at the same time forcing disengagement of the plunger 215 with the vertical movement gear 213. At this time the vertical movement gear 213 and the threaded shaft sleeve 210 once again resume floating rotation with the threaded gear shaft 209, and the cutting block 196 is stopped at the "ON" position.

Upon completion of the cutting operation, and in the event that no fractional movement of the cutting block 196 has occurred, the cutting block 196 is returned to its raised "OFF" position by means of the ratchet return gear 214, a reversal fin 224, a fin retraction spring 225, and a fin stop piece 226, the latter three elements 224, 225 and 226 being fixedly mounted on the cutting block cell 208. As is seen in FIG. 11c and 11d, as the cutting block 196 descends, the ratchet return gear 214 contacts the reversal fin 224. However in view of the skewed angle of the teeth of the ratchet gear 214, and under the force of the retraction spring 225, the reversal fin merely pivots to and fro from the fin stop 226 with no influence on the descent of the cutting block 196. When it is desired to return the cutting block to the raised "OFF" position, the direction of rotation of the gear shafts 198 and 200 are reversed, thereby causing a rotation reversal of the gear 202, the threaded gear shaft 209, the shaft sleeve 210, the vertical movement gear 213, and the ratchet return gear 214. The reversal fin 224 then engages the teeth of the ratchet return gear 214 and terminates the free "floating" rotation of the threaded shaft sleeve 210 with the threaded gear shaft 209, thereby causing the cutting block 196 to rise within the cutting block cell 208. As the cutting block 196 rises, the reversal fin 224, after a short travel of the cutting block, disengages with the ratchet return gear 214, but by that time the plunger roller 216 has departed from the cell wall recess 223, thereby causing the plunger 215 to engage the vertical movement gear 213, thus preventing free rotation of the threaded shaft sleeve 210 on the threaded gear shaft 209 and maintaining the ascent of the cutting block 196. The cutting block 196 therefore continues to rise until the plunger roller 216 reaches the cell lip 222 whereupon the plunger expansion spring 218 forces the roller 216 onto the cell lip 222, and concurrently the plunger 215 out of engagement with the vertical movement gear 213. At this time the threaded shaft sleeve 210 once again freely rotates with respect to the threaded gear shaft 209, ascent of the cutting block 196 ceases, and the cutting block 196 has reached its "OFF" position.

Cutting carriages 172 and 174 are also provided with air conduit 228 connected to a source of compressed air. This source of compressed air can advantageously be the compressed air reservoir 140 discussed above, or other wise a conventional source of compressed air. Air conduit 228 runs the length of each cutting carriage and is located between the front and back rows of cutting block assemblies. Each cutting block assembly is also provided with a cutting blade air chamber 234 which is attached to the cutting block 196 and which is vertically movable in a cylindrical container 235. The base of the container 235 is provided with an access opening 230 which communicates with an opening 231 in the air conduit 228. The chamber 234 in turn has an air inlet 232 cut into its side at the top of the chamber 234. Upon lowering of the cutting block 196 to the "ON" position, the chamber 234 is likewise lowered such that the openings 230, 231 and 232 overlap, thereby providing compressed air cutting power to the cutting blade 236 of the particular cutting block 196. Air line 238, which is made flexible to permit the lateral fractional cutting block movement described hereinafter, is connected to the chamber 234 and channels compressed air from the cutting blade air chamber 234 to cutting blade propellant fins 240, thereby causing the cutting blade 236 to rotate at a rapid speed.

The fractional movement mechanism 242 of the present invention is now described with the air of FIGS. 11a and 13. As mentioned above, the glass cutting accuracy of the present invention is to 1/32 of an inch, and therefore the fractional movement mechanism is designed accordingly. In addition to the cutting block vertical movement worm gear control shafts 198 and 200, each cutting carriage 172 is also provided with a pair, 244 and 246, of fractional movement worm gear control shafts, with shaft 246 being dedicated to the front row and shaft 248 to the back row of the cutting block assemblies. Each cutting block 196 is individually embossed with a built-in gear 248 at the base of the cutting block 196. Upon the lowering of the cutting block 196 to the "ON" position, the embossed gear 248 meshes with a sleeve gear 250 which rotates freely on its associated fractional movement worm gear shaft. Sleeve gear 250 is provided with conical openings 252 at either end, and with a bearing section 254 between the conical openings 252. Bearing section 254 enables the free rotation of the sleeve gear 250 on the fractional movement worm gear shaft. Communicating with the conical openings 252 of sleeve gear 250 are frictional cones 256 which are laterally movable on the fractional movement worm gear shaft and which rotates with this shaft. Also shown in FIG. 13 are linkage yokes 258 which are attached to the outside ends of the frictional cones 256. Linkage yokes 258 are connected by means of a linkage mechanism 260 to the armature 208 of fractional movement solenoid 204. The armature movement resulting from an energization of solenoid 204 causes the linkage mechanism 260, supported by linkage rollers 262, to apply a lateral force to the linkage yoke 258 in the direction of the frictional cone 256, thereby squeezing the cones 256 towards one another. As frictional cones 256 travel laterally towards one another, cones 256 contact the sleeve gear conical openings 252. At this time the sleeve gear 250, which normally rotates freely on its associated fractional movement worm gear shaft 244 or 246, is forced to rotate along with the frictional cones 256 as a result of the frictional forces asserted by cones 256 against the sleeve gear conical openings 252. Since the sleeve gear 250 at this point engages the embossed gear 248 at the base of the cutting block 196, rotation of the sleeve gear 250 induces lateral fractional movement of the cutting block 196. It is noted that the slot 261 is provided in one side wall of the cutting block 196 to permit clearance of the sleeve 211 during lateral fractional movement of the cutting block 196.

Control of the lateral fractional movement of the cutting block 196 is now discussed with the aid of FIG. 12. As seen in FIG. 12a, each cutting block assembly 186 includes not only the cutting block cell 208, but also a dummy cell 264 on which is housed the vertical movement solenoid 203. The dummy cell 264 is located adjacent the cutting block cell 208 in the same row, front or back, of the associated cutting carriage. The base 266 of dummy cell 264 as shown in FIG. 12b is embossed with a plurality of contact pairs 272 which are spaced in a saw tooth manner at 1/32 of an inch intervals as shown in FIG. 12c. Accordingly, 31 fractional movement contact pairs are provided on the base 266 of dummy cell 264. Upon selection of a particular fractional movement by the operator in control center 34, a voltage is applied across the contact pair 268 associated with the particular fractional movement selected.

Figure 12A:
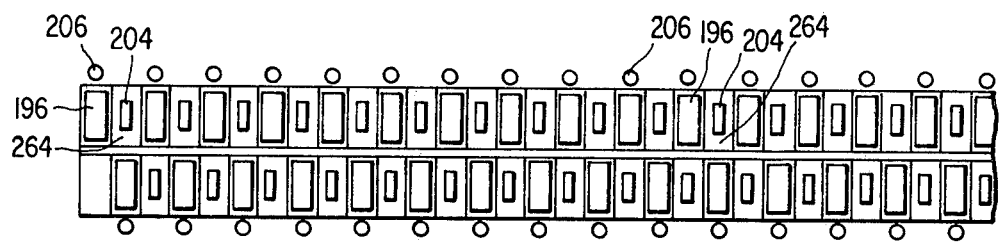
FIG. 12a is a top view of a double row of cutting block assemblies of the cutting mechanism of the present invention, FIG. 12b (i) and FIG. 12b (ii) are side views of the front and back rows of the cutting block assembly.
Figure 12B:
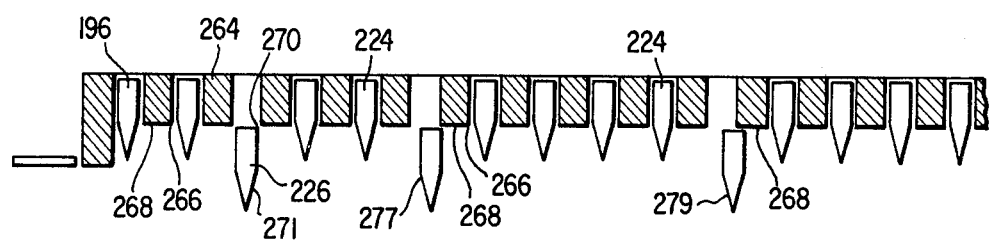
FIG. 12c is a top view of the twin circuitry patterns used to control the fractional movement of each cutting block assembly.
Figure 12C:
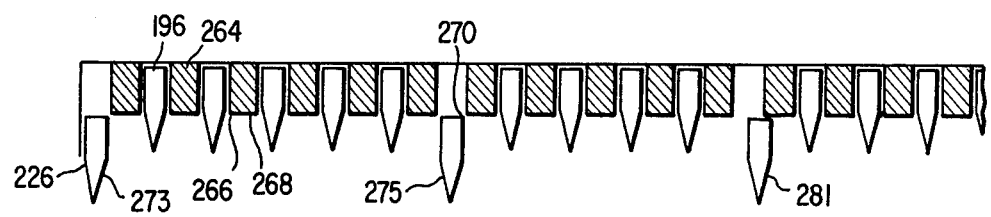
Figure 12C:
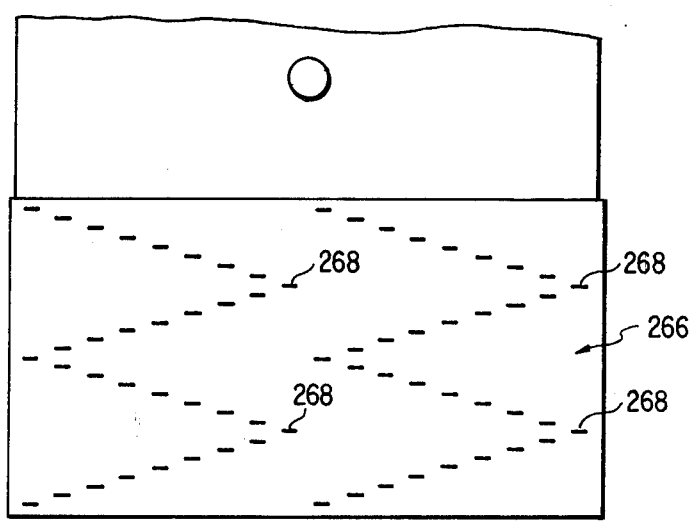

Each cutting block 196 is also provided with an electrical current conducting contact strip 270. The contact strip 270, is elevated above the plunger contact pad 207, and is located at the upper leading edge of cutting block 196 as shown in FIGS. 12a and 12b. The contact strip 270 lightly engages each of the fractional movement contact pairs 268 during the fractional movement of the cutting block 196. When the contact strip 270 engages the particular contact pair 268 associated with the operator selected fractional movement, the contact strip 270 short circuits the voltage placed across only that contact pair and thereby induces an electrical current. This current is then sensed at the control center 24 which responds by deenergizing the fractional movement solenoid 206 of that particular cutting block 196. At this point, the armature 208 of solenoid 206 is released, thereby causing the linkage 212 to disengage the frictional cones 256 from the conical openings 252 of sleeve gear 250. Thereupon sleeve 250 once again freely rotates on its associated shaft 244 or 246, the fractional movement of cutting block 196 is discontinued, and the cutting block 196 comes to rest at the designated fractional movement position. As shown in FIG. 12a, the cutting blocks 196 labeled as 271, 273, and 275 have been lowered to the "ON" position but with no fractional movement. Also, the cutting blocks, 196 labeled as 277, 279 and 281 are shown in the "ON" position with fractional movement. All other cutting blocks 196 are in the "OFF" position.

As discussed above, the dimensions of the cut glass sheet are determined by the particular cutting block assemblies 186 programmed by the operator in control center 24. At commencement of the particular program, rotation of vertical shafts 198 and 200 and fractional movement shafts 242 and 244 is initiated. Thereupon the operator sequentially selects those cutting blocks 196 to be lowered to the "ON" position, and the fractional movement associated with each of these cutting blocks. These selected cutting blocks 196 are then sequentially lowered in accordance with the operator's selections. Thereupon the cutting carriage is lowered onto the molten tin bath 10 and the molten glass sheet extruded onto the tin bath 10 is cut into the prescribed dimensions by alternate passes of the cutting carriages 172 and 174.

In cutting a glass sheet in the semi-molten state while lying upon molten tin, the cutting blades 236, rotated by compressed air, penetrate completely through the thickness of the glass sheet, thus making it unnecessary to separate lites in the cooled rigid state, as is necessary when glass is cut by scoring or surface cutting. During cutting carriage movement, the lower edge of the cutting blades 236 rotates without damage in the molten tin. A reuniting of glass edges after cutting, or "reflow" is prevented as the pressure of the glass sheet upon the molten tin causes it to exude upward in the wake of the cutting blade path. A separator is formed by the molten tin between the edges, though these edges are in close proximity. Also, it is noted that the rotating blade 236 tends to release portions of the molten tin from its sides to the edges of the glass, thereby further preventing "reflow".

Upon completion of the alternate passes of cutting carriages 172 and 174, the glass cutting frame 168 is raised to an elevated position above the tin bath 10, whereupon the cut glass sheet is removed from the tin bath 10 by means of transfer and tempering unit 272, which is discussed in detail hereinafter.

Upon removal of the cut glass sheet, another molten glass sheet is extruded over the tin bath 10. If this newly formed molten glass sheet is to be cut to the same dimension as the previous glass sheet, than the glass cutting frame 168 is merely lowered over the molten tin bath, and the alternate passes of cutting carriages 174 and 176 are initiated. However, if the newly formed glass sheet is to be cut into a different size, then the previously selected cutting block assemblies are reset, in the presently described manner, and a new cutting program is initiated.

The resetting of the cutting block assemblies 186 to the "OFF" position is accomplished by re-initiating the rotation of the fractional movement shafts 244 and 246. However, in the resetting process, the direction of rotation of these worm gear shafts is reversed from the direction of rotation employed during the cutting block selection process. After initiation of the reversed shaft rotation, each of the previously selected fractional movement solenoids 206 are reactivated to engage their respective fractional movement mechanisms 242. At this time fractional movement linkage mechanism 260 again initiates lateral movement of linkage yokes 258, thereby forcing frictional cones 256 into contact with sleeve conical openings 252. Thereupon sleeve gear 250 which has remained in engagement with embossed gear 248 at the base of cutting block 196, commences rotation in the same direction as its associated fractional movement shaft 244 or 246, thereby imparting a return lateral movement to the cutting block 196. Upon return to the whole inch "On" position, a conventional contact switch (not shown) is closed and results in the deenergization of fractional movement solenoid 206. At this point the reverse rotation of the vertical movement shafts 198 and 200 is initiated, thereby causing the ratchet return gear 214 to engage the reversal fin 224, whereupon ascent of the cutting block 196 to the "OFF" position commences in the manner discussed above.

Figure 11E:
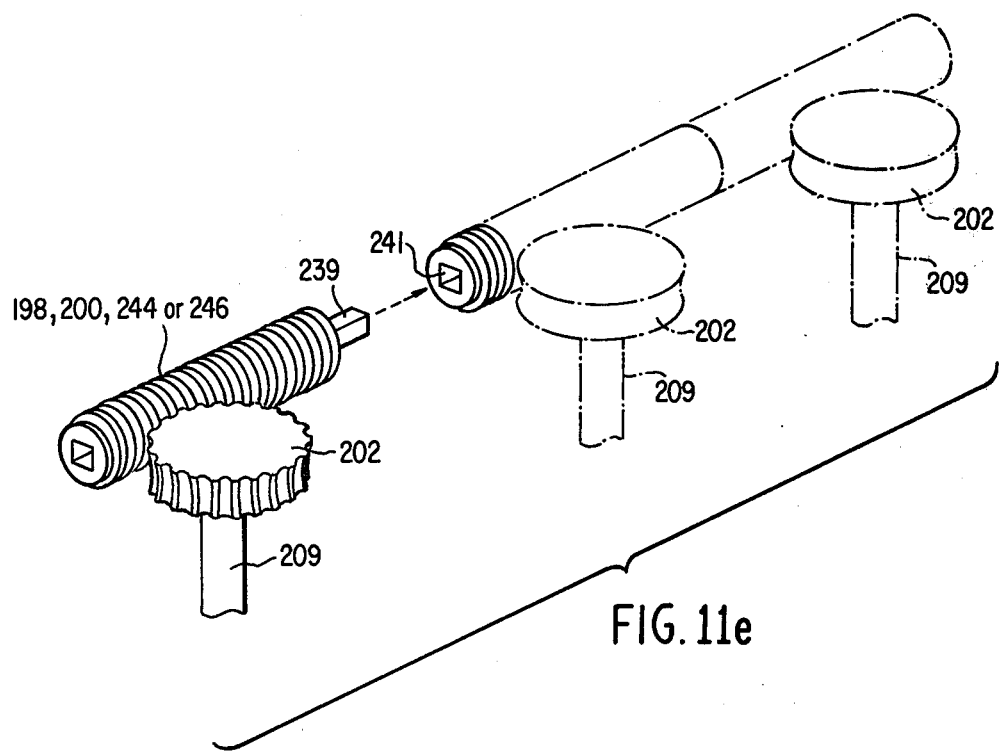
FIG. 11e is a perspective view of a worm gear shaft formed of individual shaft segments.

It is noted that the worm gear shafts 198, 200, 244 and 246 can each be fabricated of a single long gear shaft, or these shafts can be constructed of a plurality of individual worm gear segments coupled to the end to form a single long gear shaft as seen in FIG. 11e. Coupling can be accomplished by providing each segment with a square coupling peg 239 at one end of the segment, and a mating coupling hole 241 at the other end. Thus, the peg 239 of one segment mates with the coupling hole 241 of an adjacent segment. Segmentized gear shaft segments naturally have their threads, coupling pegs, and coupling holes arranged to provide a continuous threaded worm gear shaft upon assembly, and facilitate maintanence of the cutting carriages 172 and 174 in the event of a failure of one of the cutting block assemblies 186.

As mentioned above, upon completion of the cutting action, glass cutting frame 26 is raised and removed from the tin bath. The newly cut glass sheet is then removed from the tin bath by means of transfer and tempering unit 272, which is viewed in FIG. 14a. Transfer and tempering unit 272 is connected to a conventional reversible vacuum source 283 which communicates with the transfer and tempering unit 272 through vacuum port 274. The glass sheet, cut to lite sizes, is lifted by suction from the tin bath by the multiple orifices 276 which communicate with a vacuum port 274. The multiple orifices 276, through which a particle vacuum is applied when a sheet transfer place is to be performed, holds the glass sheet securely, thereby preventing any lateral movement of the glass sheet that might inadvertently cause surface scratching. Furthermore, in anticipation of the possibility of glass sheet surface marring by the multiple orifices, a smooth absorbent and flexible material with openings to accommodate the multiple orifices 276 can be applied to the entire undersurface of the transfer unit 272 to provide a protective lining 280 to protect against glass surface marring. The lining 280 can be made of the same material used for the swab paste applicators 174 discussed above. Just prior to the commencement of a transfer passage, a mold paste, similar to the swab applicator paste discussed above, can be applied to the surface of the protective lining 280 to ensure the surface integrity of the newly formed glass sheet.

Transfer unit 272 transports the glass sheet from the molten tin bath 10 to either the tempering chamber 12 or the annealing lehr 18, shown in FIG. 1. If an annealing phase is scheduled, the glass sheet is tramsported to the annealing lehr 18, the partial vacuum existing at orifices 276 is slowly released, and the glass sheet is gently lowered to the annealing conveyor 282 shown in FIG. 2. At the annealing lehr entry point 284 is provided a draft shroud 286 which protects against undesirable cross currents of cool air which may be detrimental to proper annealing. The annealing conveyor 282 upon receiving the glass sheet from the transfer unit 272 is activated and conveys the glass sheet through the annealing lehr 18, which is otherwise of conventional design. During the annealing process, which takes approximately 20 to 30 minutes to complete, the glass sheet temperature is reduced from approximately 1200° to 1500° F. to room temperature. Upon completion of the annealing process, the glass lites are subjected to electronic inspection at quality control inspection station 20 and then removed to packaging area 22 for further processing.

If the glass lite is to undergo a tempering phase, transfer and 272 then transports the glass sheet from the tin bath 10 to the tempering chamber 12 shown in FIG. 1. At tempering chamber 12, the glass sheet is gently lowered into a tempering chamber conveyor 290. Situated between the belt 292 of conveyor 290 is the lower tempering unit 294. Lower tempering unit 284 engages transfer and tempering unit 272 at this point such that they completely surround the glass sheet lying on the conveyor belt 292 and thereby form the tempering chamber 12. Lower tempering unit 294, like the transfer unit 272, is provided with multiple orifices 296 which communicate with an air port 298 as shown in FIG. 14a. At this point, the orifices 276 of the transfer and tempering unit 272, which were previously used to provide the suction by which the glass sheet was lifted from the tin bath 10, are instead used to route a stream of cold air from the reversible vacuum source to the top surface of the glass sheet. Simultaneously, cold air is delivered from a conventional air blower 285 to the bottom surface of the glass sheet from the orifices 296 in the lower tempering unit 294. The simultaneous application of the cold air to each surface of the glass, creates a high compression state on these surfaces and produces an internal tension within the glass, which remains at a high temperature relative to the surfaces of the glass sheet. The resulting tempered glass product is relatively scratch resistant, and upon breakage, breaks into the small interlocking segments associated with safety glass.

When the initial tempering phase as discussed above is completed, the tempering chamber conveyor 290, which also serves as a bed for the glass sheet during this initial tempering phase, delivers the sheet to a second conveyor 300. The transfer unit 272 disunites with the lower tempering unit 294 for the release of the glass sheet to the second tempering converyor 300. Conveyor 300 transports the glass lite to the transfer area 14 shown in FIG. 1 whereupon the conveyor mechanism 300 executes a 90° turn. The glass sheet then proceeds to the tempering lehr 16, and undergoes a second tempering phase in conventional tempering lehr 16. Thereafter the glass sheet is removed from the tempering lehr 16 for electro-optic inspection at quality control center 20.

Electro-optic inspection is accomplished by means of a light beam source 20a and a photocell detector 20b situated at the level of the cut glass sheet as it leaves the tempering lehr 16 or the annealing lehr 18 upon entering the quality control area 20. (see FIG. 1) Any opaque occlusions, caused by impurities, pebbles, ect. break the light beam and indicate a fault in one dimension of the glass lite. For all but the highest quality glass, unidirectional inspection is adequate. However, if precise fault detection is desired, the cut glass lite can be rotated 90° at the quality control center 20, and passed by a second pair of electro-optical devices, whereupon bidirectional fault isolation is derived. After electro-optic inspection the glass lite proceeds to packaging area 22.

Figure 15:
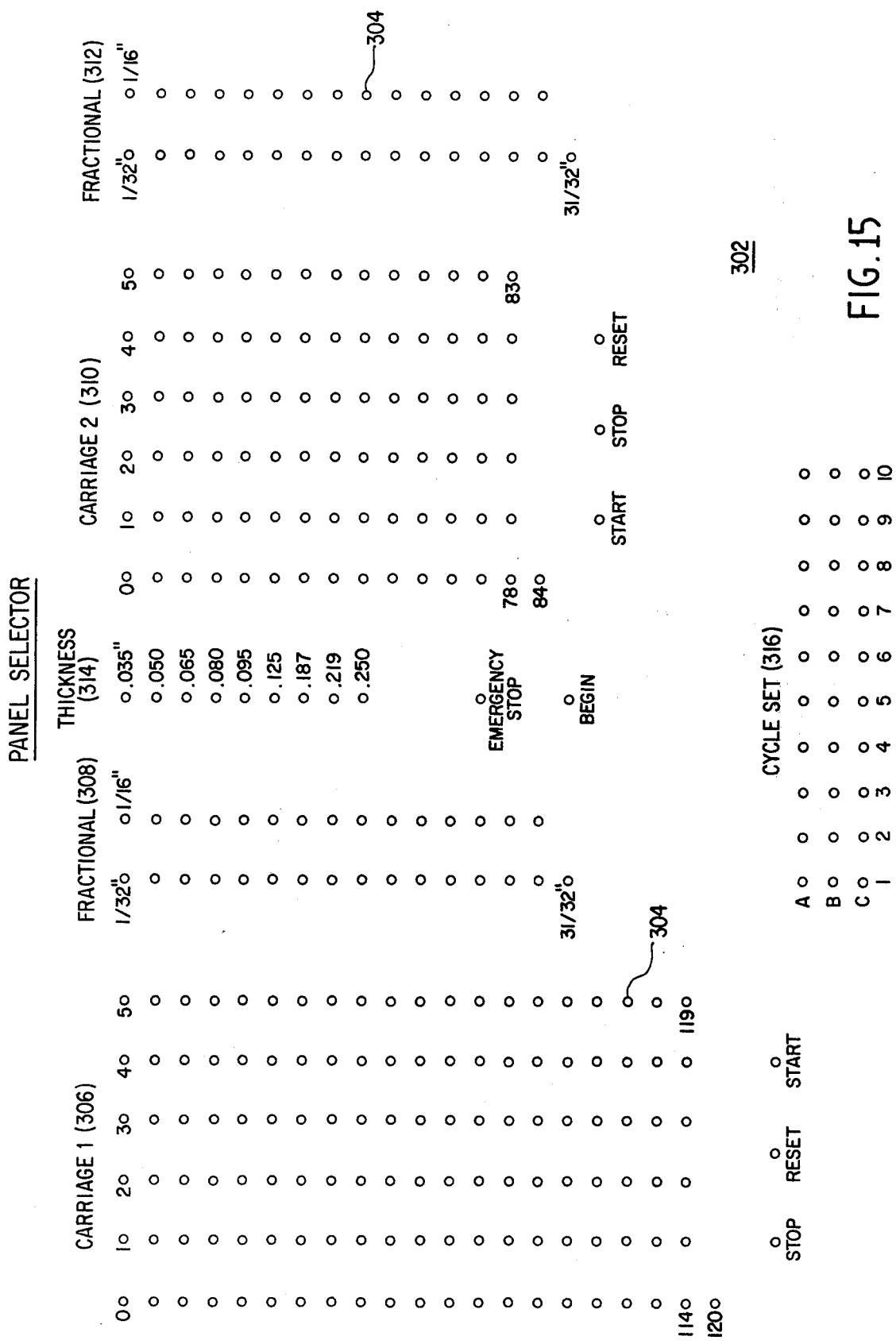
FIG. 15 is a view of a panel selector located in the control center.

A central control of the entire glass manufacturing process, from the intake of raw batch material via the portable furnace intake chute 50 to the packaging of the finished glass product at the packaging area 22, is provided by means of the centrally located control center 24, as seen in FIG. 1. From the central vantage point of control center 24, a minimum of personnel have visual access to all points of the glass manufacturing operation and, by means of various panel controls, is able to monitor and control the glass manufacturing operation. Once such panel control unit 302 is seen in FIG. 15 to employ a plurality of push button type switches 304 by which much of the glass manufacturing process is controlled. The push button switches 304 are arranged in groups, with each group relating to a particular aspect of the glass manufacturing process. For example, one group 306 selects those cutting block assemblies 186 in cutting carriage 172 to be activated in the particular cutting operation. The group of push button switches labeled as 308 in FIG. 15 controls the fractional additions to be added to the whole inch of the various cutting block assemblies 186 of cutting carriage 172 selected by the push button switches in group 306. Likewise, the cutting block assemblies 186 selected for cutting carriage 174 and the fractional additions therefor are selected by those push button groups labeled as 310 and 312 respectively. In selecting a particular glass lite size, a particular cutting block and its fraction addition is selected.

Thereafter, the remaining cutting block assemblies and their respective fractional additions are sequentially selected. Pushbutton switch groups 306 and 310 are also provided with "START", "RESET" and "STOP" programming controls.

The "START" puch-button commence rotation of the worm gear shafts 198, 200, 244 and 246 by which cutting block assemblies 186 are activated, and are depressed before the cutting block assembly switches are depressed. The "RESET" push-button alternately commences the counter-rotation of shafts 198, 200, 244 and 246 by which the cutting blocks 196 are returned to their "OFF" position 224. The "STOP" pushbutton enables the operator to correct a mistake in selection of a cutting block assembly, or a malfunction in either cutter carriage 172, or 174. Upon depressing a "STOP" button, shafts 198, 200, 244 and 246 commence counter-rotation. Thereafter, those cutting block assemblies selected are returned to the "OFF" position.

Glass lite thickness and strength is selected by the switches in the group labeled as 314. The switches of group 314 govern not only the quantity of molten glass deposited into the extruder chamber 100, but also the separation distance between extruder glass sheet rollers 94 and 96, since glass thickness is governed by both of these factors. Nine switches are provided for the nine thicknesses ranging from this 0.035 inches to the thickest setting of 0.250 inch. For each of the 9 thickness selections, the quantity of molten glass deposited into the extruder chamber is governed by the number of clockwise revolutions of the basin cylinders 6.

For example, the quantity of molten glass needed to extrude the thin sheet of 0.035 inches would require 3 revolutions of the basin cylinder. Therefore to progress to each of the other 8 strength settings, an additional revolution for each thickness would be necessary, or as follows:

| Strength | Basin Cylinder Revolutions |
|----------|----------------------------|
| .035"    | 3                          |
| .050"    | 4                          |
| .065"    | 5                          |
| .080"    | 6                          |
| .095"    | 7                          |
| .125"    | 8                          |
| .187"    | 9                          |
| .219"    | 10                         |
| .250"    | 11                         |

Also, the number of cycles a particular glass lite size is to be produced is governed by the pushbutton switches contained in group 316. For example, if 158 glass sheet extrusions and cuttings of the same lite sizes are required, then the pushbutton switches 1, 5, and 8, of the lines A, B, and C, respectively of group 16 would be selected. Furthermore, by selecting glass sheet thickness and the total number of cycles, a calculation is automatically made by computing circuits within the control center, to deliver the prescribed amount of raw glass batch to the furnace intake. This amount of raw batch material delivered to the furnace is continually updated in accordance with the glass requirements programmed at panel control unit 302.

Panel control unit 302 is also provided with a BEGIN pushbutton switch by which the glass sheet cutting process is initialted upon the completion of the lite size programming sequence described above. An emergency stop button is also provided so that the entire glass manufacturing process can be halted at any time within the discretion of the operator located in the control center 24.

In view of the above discussion, it is believed that the inventive features attendant to the present invention address a number of shortcomings found in the prior art. For example, the air cooling passageway 42 surrounding the vertical furnace 2 and the transverse refiner 4 provide a low exterior temperature of the refractory brick lining 34 which forms the inner wall of the furnace and the refiner sections, while concurrently leaving the furnace interior temperatures unaffected because of the 10 to 16 inch thickness of the refractory brick lining. This air cooling feature tends to diminish high temperature pockets, especially at the electrodes, and therefore tends to evenly distribute heat within the furnace. The design of the electrode cartridge, and in particular the insulator lining 48, further reduces localized heating effects. As a result, not only are temperature gradients diminished and a more homogenous glass product formed, but also the service life of the furnace walls is increased, thereby decreasing maintenance requirements. Furthermore, in view of the fact that molten glass is withdrawn from the base of the vertical furnace 2, the dependence of the generation and maintenance of convection currents within the molten galss is minimized, thereby assuring a more homogenous glass melt.

The design of the basin cylinders 6 and their relationship to the transverse refiner 4 represents a significant advance in the art of metering glass charges. Not only does the basin cylinders 6 precisely meter glass to the extruder device, but it also enhances the glass melt homogeneity within the transverse refiner as a result of the incidental glass mixing effect produced by the revolutions of the basin cylinders. Also, the balanced design of the two basin cylinders employed, i.e., one basin cylinder 6 at each end of the transverse refiner, promotes a thermal symmetry within the refiner which additionally contributes to a homogenous glass melt. Also, the transverse refiner glass level control produced by the refiner float 76 and the cut-off mechanism 66 maintain a constant transverse refiner glass level 72 which assures a uniform metering of molten glass by the basin cylinder 6.

Likewise, the extruder mechanism 8, including the eccentrically pivoted extruder rollers 94 and 96, provides a highly reliable technique by which glass sheet of a particular thickness and strength is reproduced. Extruder operation powered by compressed hot air maintains the extruder temperature at a sufficiently high level such that the glass melt is easily maintained in its molten state, thereby assuring the feasibility of the applying extruding techniques to the glass sheet forming process.

The advantages of the glass cutting apparatus of the present invention are manifold. As a result of the multiple cutting block assemblies 186 housed by the cutting carriage assemblies 172 and 174, the glass sheet can be cut with a degree of automation and precision virtually unknown heretofore. Also, by cutting the newly formed glass sheet while it still remains on the molten tin bath 10, it becomes possible to dispense with the glass sheet scoring step which is extensively used in the prior art. Elimination of this scoring step decreases glass breakage, and furthermore hastens the glass manufacturing process. Also, energy is conserved, because it is no longer necessary to reheat a newly cut glass sheet in order to put this glass sheet in the proper thermal state for subsequent tempering treatment.

The transfer and tempering unit 272 of the present invention advantageously provides a technique by which the newly cut semi-molten glass heat can be transferred to a tempering chamber, while nevertheless maintaining this glass sheet in its flat condition. Furthermore, the dual utilization of the transfer and tempering unit 272, as both a "transfer" and a "tempering" unit, by changing the direction of air flow through the vacuum port 274, decreases system complexity and optimizes plant space utilization, while improving the overall efficiency of the operation.

Additionally, the design of the electrode cartridge assembly 44 with it cartridge lock-in doors 50, lock-in latchs 51, and casing cut off 52 enables speedy on-line electrode replacement without the necessity of furnace shut down. Obviously, this on-line replacement feature enhances overall system productivity, while substantially reducing system maintenance costs.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An automated all-electric glass manufacturing apparatus comprising:
   vertical air-cooled furnace means for melting raw materials into molten glass, said furnace means having a top, a base, and a throat opening at said base of said furnace means;
   transverse air-cooled refiner means coupled to said furnace throat opening for receiving said molten glass from said furnace means, and for maintaining said molten glass in a homogenous molten stage, said refiner means having a plurality of molten glass exit openings;
   refiner glass level maintaining means for controlling the molten glass intake of said refiner means from said furnace throat openings;
   molten glass metering means for forming a glass charge of a predetermined volume of molten glass, and for delivering said molten glass charge from said molten glass exit openings of said refiner means; and,
   molten glass extruding means for receiving said glass charge from said metering means and for forming said charge into a sheet of semi-molten glass of predetermined thickness, said extruding means comprising a pair of rollers and means to apply controlled pressure to said glass charge to feed said charge through said rollers.

2. An apparatus according to claim 1, further comprising:
   molten tin bath means for receiving said glass sheet from said molten glass extruding means, for imparting an ideal smoothness to said glass sheet, for maintaining said glass sheet in a semi-molten state during a subsequent cutting operation, and for rejecting peripheral scrap glass after said cutting operation.

3. An apparatus according to claim 2, further comprising:
   glass cutting means for cutting said semi-molten glass sheet into predetermined lite sizes while said sheet still lies on said tin bath.

4. An apparatus according to claim 3, further comprising:
   glass transfer and tempering means for performing the dual function of transferring a cut glass sheet from said tin bath and for applying cold air to the top and bottom surfaces of said cut glass sheet.

5. An apparatus according to claim 3, further comprising:
   electro-optical insection means for obtaining bi-directional fault detection of a cut glass sheet.

6. An apparatus according to claim 1, further comprising:
   central control means for sheltering operator personnel and for controlling the operation of said glass manufacturing apparatus.

7. An apparatus according to claim 1, wherein said vertical air-cooled furnace means is constructed of rectangularly connected walls which form a relatively tall furnace structure with relatively small cross-sectional area, said furnace means comprising:
   an inner lining of refractory brick, the inner surface of said refractory brick lining forming the interior of said furnace means;
   an inner steel plate lining surrounding and supporting said refractory brick lining;
   an outer steel plate lining surrounding said inner steel plate lining; and
   steel separators connecting said inner and outer steel plate linings;
   whereby said inner and outer steel plate linings separated by said steel separators form air-cooling passageways within said furnace walls.

8. An apparatus according to claim 7 wherein said furnace means further comprises:
   a plurality of electrode casings mounted as pairs within opposing walls of said furnace means; and,
   a plurality of molybdenum electrode cartridges housed within said casings.

9. An apparatus according to claim 8, wherein each of said electrode casings of said furnace means comprises:
   a hollow tubular body having an interior in communication with said interior of said furnace means, and an exterior opening accessible to operator personnel;
   casing lock-in means attached to said exterior opening for maintaining said electrode cartridge in position within said hollow tubular body; and
   casing cut-off means coupled to said hollow tubular body for preventing the escape of molten glass from said interior of said furnace to said exterior opening of said casing during on-line replacement of said electrode cartridge.

10. An automated all-electric glass manufacturing apparatus according to claim 9, wherein said casing lock-in means of said electrode casing comprises:
    a pair of lock-in doors hingedly attached to said casing at said exterior opening; and
    latch hook means attached to said lock-in doors for maintaining said electrode cartridge locked in position within said casing.

11. An apparatus according to claim 1, wherein said vertical air-cooled furnace means comprises:
    removeable electric resistance pre-heating electrode means for commencing the melting of raw batch materials delivered to the base of said furnace.

12. An apparatus according to claim 1, wherein said transverse air-cooled refiner means is constructed of rectangularly connected walls which form a relatively short refiner structure with relatively large cross-sectional area, said refiner means comprising:
  an inner lining of refractory brick, the inner surface of said refractory brick lining forming the interior of said refiner means;
  an inner steel plate lining surrounding and supporting said refractory brick lining;
  an outer steel plate lining surrounding said inner steel plate lining; and
  steel separators connecting said inner and outer steel plate linings;
  whereby said inner and outer steel plate linings separated by said steel separators form air-cooling passageways within said walls of said refiner means.

13. An apparatus according to claim 12, wherein said refiner means further comprises:
  a plurality of electrode casings mounted as pairs within opposing walls of said refiner means; and
  a plurality of molybdenum electrode cartridges housed within said casings.

14. An apparatus according to claim 13, wherein each of said electrode casings comprises:
  a hollow tubular body having an interior opening in communication with said interior of said refiner means, and an exterior opening accessible to operator personnel;
  casing lock-in means attached to said exterior opening for maintaining said electrode cartridge in position within said hollow tubular body; and,
  casing cut-off means housed in said hollow tubular body for preventing the escape of molten glass from said interior of said refiner means to said exterior opening of said casing during on-line replacement of said electrode cartridge.

15. An apparatus according to claim 14, wherein said casing lock-in means comprises:
  a pair of lock-in doors hingedly attached to said casing at said exterior opening; and
  latch hook means attached to said lock-in doors for maintaining said electrode cartridge in position within said casing.

16. An apparatus according to claim 1, wherein said refiner glass level maintaining means comprises:
  float device means for monitoring the molten glass level within said refiner;
  refiner intake cut-off means coupling said furnace means to said refiner means, for controlling the intake of molten glass into said refiner in accordance with the output of said float device means; and
  electrical signaling circuitry means coupled to said float device means for generating an electrical representation of said glass level means, and for displaying said electrical representation in said central control center.

17. An apparatus according to claim 1, wherein said molten galss metering means comprises:
  a plurality of basin cylinders located symmetrically within said transverse refiner means and in communication with said exit openings of said transverse refiner means, each of said basin cylinders having a plurality of glass dispensing chambers of a known discrete volume, said glass dispensing chambers having a plurality of openings which upon rotation of said basin cylinders alternately communicates with said interior of said refiner means and then with said molten glass refiner exit openings;
  whereby molten glass from said refiner means enters each of said glass dispensing chambers of said basin cylinders, and upon rotation of said basin cylinders, said molten glass is thereby delivered from said refiner means through said refiner molten glass exit openings, the amount of said glass dispensed from said basin cylinders forming a molten glass charge of a predetermined volume in accordance with the known molten glass capacity of said dispensing chambers.

18. An apparatus according to claim 2, wherein said molten glass extruding means comprises:
  a glass charge storage chute which receives said molten glass charge from said molten glass metering means;
  a glass charge extruder device coupled to said storage chute and having an intake stroke and an extrusion stroke, said extruder device receiving said molten glass charge from said glass charge storage chute during said intake stroke and extruding said molten glass charge during said extrusion stroke;
  eccentrically pivoted glass sheet rollers coupled to said extruder device for rolling extruded molten glass into glass sheets of a predetermined thickness;
  a mobile extruder carriage which houses said storage chute, said extruder device and said roller means, said mobile extruder carriage laterally moveable over said tin bath means during said extrusion stroke; and
  compressed air generation means for operating said extruder device;
  whereby said glass charge is formed into a semi-molten glass sheet of a predetermined thickness, and said glass sheet is deposited from said molten glass extruding means onto said tin bath means as said mobile extruder carriage laterally moves across said tin bath means during said extrusion stroke of said extruder device.

19. An apparatus according to claim 18, wherein said compressed air generation means comprises:
  a compressed air reservoir; and
  a plurality of cylindrical air compression chambers, each chamber having irreversible intake valve means in communication with said furnace air-cooling passageways, irreversible exhaust valve means in communication with said compressed air reservoir, and air compression piston means travelling the length of said cylindrical air compression chambers, said air compression piston means having an expansion stroke and a compression stroke within said air compression chamber in accordance with the movement of said mobile extruder carriage;
  whereby hot air is admitted into said air compression chamber via said air compression chamber intake valve during said expansion stroke of said air compression piston means, and said hot air is exhausted into said compressed air reservoir from said air compression chamber via said air compression chamber exhaust valve during said compression stroke of said air compression piston means, thereby filling said compressed air reservoir with compressed air.

20. An apparatus according to claim 2, wherein said molten tin bath means comprises:

a molten tin bath container having rectangular bottom, front, back and side steel plated faces, and an open top face;

molten tin within said molten tin bath container;

electrode means traversing the interior of said container for maintaining said molten tin in the molten state;

an external flat flange seated horizontally on said front, back and side steel plate faces around the perimeter of said open top face, said external flange overlapping said front, back and side faces and having a plurality of recessed indentations proportionately spaced in said external flange; and scrap glass rejection means for removing scrap glass from said tin bath means, said glass rejection means comprising a rotating bar, a plurality of rejection forks rigidly attached to said rotating bar, said rejection forks horizontally seated in said recessed indentations of said external flange when said rotating bar is rotated in a first direction, and said rejection forks rotated to a substantially vertical position when said rotating bar is rotated in a second direction opposite to said first direction;

whereby peripheral scrap glass lying on said external flange is removed from said molten tin bath as a result of the horizontal to vertical rotation of said rejection forks.

21. An apparatus according to claim 3, wherein said glass cutting means comprises:

a vertically mobile rectangular cutting frame having a flat horizontal internal flange at the base of said frame, said internal flange having the same dimensions as said external flange of said tin bath means, said internal flange of said cutting frame and said external flange of said tin bath means firmly clasping said molten glass sheet extruded on said tin bath means when said vertically mobile cutting frame is lowered on said tin bath means;

first mobile cutting carriage means supported on said cutting frame for cutting said glass sheet lengthwise according to said predetermined glass lite sizes, said first mobile cutting carriage means having a plurality of identical cutting block assemblies mounted in a front row and back row, said cutting block assemblies in said front row laterally offset from said cutting block assemblies in said back row;

a second mobile cutting block carriage means supported on said cutting frame for cutting said glass sheet widthwise according to said predetermined glass lite sizes, said second cutting block carriage means also having a plurality of said cutting block assemblies in said second mobile cutting block carriage means also mounted in a front row and in a back row, said cutting block assemblies in said front row laterally offset from said cutting block assemblies in said back row;

a plurality of threaded rotatable vertical movement worm gear shafts, one said vertical movement gear shaft for each of said rows of said cutting block assemblies of said first mobile cutting carriage means and said second mobile cutting carriage means; and, a plurality of threaded rotatable fractional movement worm gear shafts, one said fractional movement gear shaft for each of said rows of said cutting block assemblies of said first mobile cutting carriage means and said second mobile cutting carriage means;

whereby said glass sheet is cut into said predetermined lite size by selectively activating particular cutting block assemblies, placing those cutting block assemblies activated in cutting position by means of the rotational movement of said vertical movement and said fractional movement gear shafts, and making alternate cutting passes of said first cutting carriage means and said second cutting carriage means over said glass sheet on said tin bath means.

22. An apparatus according to claim 21, wherein said vertical movement worm gear shafts and said fractional movement worm gear shafts comprise:

a plurality of threaded gear shaft segments linearly connected end to end to form long, continuous worm gear shafts.

23. An apparatus according to claim 21, wherein each of said cutting block assemblies in said mobile cutting carriages comprises:

a cutting block cell having vertically extending side and exterior walls, one of said exterior walls having an outwardly protruding wall recess;

a dummy cell adjacent said cutting block cell;

a vertical movement control solenoid having an armature and a coil, said armature movable upon energization of said coil, said solenoid supported on said dummy cell;

cutting block means for cutting a sheet of semi-molten glass, said cutting block means travelling vertically within said cutting block cell from a raised "OFF" position to a lowered "ON" position.

gearing means coupled to a particular vertical movement gear shaft and to said cutting block means for raising and lowering said cutting block means upon the energization of said vertical movement solenoid and in accordance with the direction of rotation of said vertical movement gear shaft;

plunger means coupled to said armature of said vertical control solenoid for engaging said gearing means upon energization of said vertical control solenoid and thereby enabling vertical movement of said cutting block means, said plunger means disengaging from said gearing means upon engaging said recess in said cutting block cell wall, and thereby disabling vertical movement of said cutting block means; and compressed air means adjacent said cutting block cell for powering said glass cutting performed by said cutting block means.

24. An apparatus according to claim 23, wherein said cutting block means comprises:

a compressed air-actuated cutting blade having a plurality of air propellant fins extending radially from the center of said blade, said blade commencing rotation upon the application of compressed air against said fins; and compressed air source engagement means coupled to said compressed air means and said cutting blade for applying compressed air from said compressed air means to said cutting blade when said cutting block means is lowered to said "ON" position.

25. An apparatus according to claim 23, wherein said gearing means comprises:

first gearing means coupled to said vertical movement gear shaft and having a threaded shaft rotatable upon rotation of said vertical movement gear shaft;

a threaded gear sleeve surrounding and threadingly engaging said threaded shaft of said first gearing means, said sleeve freely rotating in floating association with the rotation of said shaft of said first gearing means;

first and second flanges respectively connected to the top and bottom of said gear sleeve and coupled to said cutting block means;

second gearing means coupled to said first flange for curtailing the free rotation of said gear sleeve and thereby commencing relative rotation between said threaded gear sleeve and said threaded shaft of said first gearing means upon engagement of said second gearing means with said plunger means, said relative rotation producing vertical movement of said sleeve, said first and second flanges, and said cutting block means; and, third gearing means coupled to said second flange for raising said cutting block means to said "OFF" position upon a reduction reversal of said threaded gear sleeve.

26. An apparatus according to claim 25, wherein said third gearing means comprises:
a ratchet gear having skewed gear teeth, said ratchet gear coupled to said second flange; and
reversal fin means attached to said cutting block cell for temporarily engaging said skewed teeth of said ratchet gear and only preventing rotation thereof when said ratchet gear rotates in a predetermined direction.

27. An apparatus according to claim 23, wherein each of said cutting block assemblies further comprises:
fractional movement means for precisely moving said cutting block housing laterally within said cutting block assemblies in accordance with said predetermined lite size of said glass sheet.

28. An apparatus according to claim 27, wherein said fractional movement means of said cutting block assembly comprises:
a fractional movement solenoid having an armature and a coil, said armature movable upon energization of said coil;
gear threads embossed in the base of said cutting block means;
a fractional movement sleeve gear mounted on said fractional movement gear shaft, said sleeve gear having external threads which engage said embossed gear threads when said cutting block is in said lowered "ON" position, a central bearing section, end sections attached to said central bearing section, said end sections having conical openings, said bearing section enabling free rotation of said sleeve gear on said fractional movement shaft;
friction cones mounted on said fractional movement gear shaft and facing said conical openings of said sleeve gear, said friction cones having an interior side of conical shape and a flat exterior side, said friction cones laterally movable on said fractional movement shaft and fixedly rotating with said fractional movement shaft;
linkage yokes attached to said flat exterior sides of said friction cones;
fractional movement linkage means connecting said armature of said fractional movement solenoid and said linkage yokes; and fractional movement circuit means for sensing the fractional movement of said cutting block and stopping said fractional movement of said cutting block in accordance with said predetermined lite size of said glass sheet;

whereby energization of said fractional movement solenoid coil induces movement of said fractional movement solenoid armature, said movement causing fractional movement linkage means to compress said linkage yokes towards one another, said compression of said linkage yokes causing the frictional engagement of said friction cones with said conical openings of said sleeve gear, said frictional engagement causing rotation of said sleeve gear along with the rotation of said fractional movement gear shaft, said rotation of said sleeve gear causing the fractional movement of said cutting block as a result of engagement of said sleeve gear with said embossed gear threads when said cutting block is in said lowered "ON" position, said fractional movement circuit means stopping said fractional movement after a predetermined distance.

29. An apparatus according to claim 4, wherein said glass transfer and tempering means comprises:
a mobile transfer and tempering upper frame having a plurality of suction orifices and a first air port in communication with said suction orifices, said upper frame used to transfer and to temper said cut glass sheet; and
reversible vacuum source means in communication with said first air port, said reversible vacuum source means acting as a vacuum source when said upper frame is used to transfer said glass sheet, and as an air blower when said upper frame is used to temper said glass sheet;
whereby said reversible vacuum source means produces a suction force in said plurality of orifices, said suction force holding said cut glass sheet to said mobile upper frame when said mobile upper frame is lowered over said cut sheet of semi-molten glass.

30. An apparatus according to claim 29, wherein said glass transfer and tempering means further comprises:
a lower stationary tempering frame having a plurality of orifices and a second air port in communication with said orifices, said lower frame uniting with said mobile upper frame upon transfer of said semi-molten glass sheet;
an air-blower in communication with said second air port; and
conveyor means for supporting said cut glass sheet when said glass sheet is transferred to said lower stationary frame by said mobile upper frame and for transferring said cut glass sheet from said lower stationary frame;
whereby said mobile upper frame and said stationary lower frame apply cold air to the top and bottom surfaces of said cut glass sheet and thereby temper said cut glass sheet.

31. A molten glass metering apparatus for forming a glass charge of a predetermined volume of molten glass, and for delivering said molten glass charge from the interior of a glass refiner having a plurality of molten glass exit openings at the base of said refiner, said molten glass metering apparatus comprising:
a plurality of basin cylinders located symmetrically within said refiner and in communication with said exit openings of said refiner, each of said basin cylinders having a plurality of glass dispensing chambers of a known discrete volume, said glass dispensing chambers having a plurality of openings which upon rotation of said basin cylinders alternately communicates with the interior of said refiner and then with said molten glass refiner exit openings;

whereby molten glass from said refiner enters each of said glass dispensing chambers of said basin cylinders, and upon rotation of said basin cylinders, said molten glass is thereby delivered from said refiner through said refiner molten glass exit openings, the amount of said glass dispensed from said basin cylinders forming a molten glass charge of a predetermined volume in accordance with the known molten glass capacity of said dispensing chambers.

32. A molten glass extruding apparatus for receiving a charge of molten glass of a predetermined volume from a glass refiner, and for forming said glass charge into a sheet of semi-molten glass of a predetermined thickness, said apparatus comprising:

a glass charge storage chute which receives said molten glass charge from said refiner;

a glass charge extruder device coupled to said storage chute and having an intake stroke and an extrusion stroke, said extruder device receiving said molten glass charge from said glass charge storage chute during said intake stroke and extruding said molten glass charge during said extrusion stroke;

eccentrically pivoted glass sheet roller means coupled to said extruder device for rolling molten glass into glass sheets of a predetermined thickness;

a mobile extruder carriage which houses said storage chute, said extruder device and said roller means, said mobile carriage laterally moveable during said extrusion stroke; and compressed air generation means for operating said extruder device;

whereby said glass charge is formed into a semi-molten glass sheet of a predetermined thickness, and said glass sheet is deposited from said glass sheet forming apparatus as said mobile extruder carriages laterally moves during said extrusion stroke of said extruder device.

33. An apparatus for receiving a charge of molten glass of a predetermined volume and for forming said glass charge into a sheet of semi-molten glass of a predetermined thickness, according to claim 32, wherein said compressed air generation means comprises:

a compressed air reservoir;

a source of hot air; and a plurality of cylindrical air compression chambers, each chamber having irreversible intake valve means in communication with said source of hot air, irreversible exhaust valve means in communication with said compressed air reservoir, and air compression piston means travelling the length of said cylindrical air compression chambers, said air compression piston means having an expansion stroke and a compression stroke within said air compression chamber in accordance with the movement of said mobile extruder carriage;

whereby hot air is admitted into said air compression chamber via said air compression chamber intake valve during said expansion stroke of said air compression piston means, and said hot air is exhausted into said compressed air reservoir from said air compression chamber via said air compression chamber exhaust valve during said compression stroke of said air compression piston means, thereby filling said compressed air reservoir with compressed air.

34. A molten tin bath for imparting an ideal smoothness to a sheet of semi-molten glass deposited on said tin bath, said tin bath comprising:

a molten tin bath container having rectangular bottom, front, back and side steel plated faces and an open top face;

molten tin within said molten tin bath container;

electrode means traversing the interior of said container for maintaining said molten tin in the molten state;

an external flat flange seated horizontally on said front, back and side steel plated faces around the perimeter of said open top face, said external flange overlapping said front, back and side faces and having a plurality of recessed indentations proportionately spaced in said external flange;

scrap glass rejection means for removing scrap glass from said flat flange, said glass rejection means comprising a rotating bar, a plurality of rejection forks rigidly attached to said rotating bar, said rejection forks horizontally seated in said recessed indentations of said external flange when said rotating bar is rotated in a first direction, and said rejection forks rotated to a substantially vertical position when said rotating bar is rotated in a second direction opposite to said first direction;

whereby scrap glass lying on said external flange is removed from said molten tin bath as a result of the horizontal to vertical rotation of said rejection forks.

35. A glass cutting apparatus for cutting said semi-molten glass sheet into predetermined lite sizes while said sheet still lies on a molten tin bath having a flat external flange, said glass cutting apparatus comprising:

a vertically mobile rectangular cutting frame having a flat horizontal internal flange at the base of said frame, said internal flange having the same dimensions as said external flange of said tin bath means, said internal flange of said cutting frame and said external flange of said tin bath means firmly clasping said molten glass sheet deposited on said tin bath means when said vertically mobile cutting frame is lowered on said tin bath means;

first mobile cutting carriage means supported on said cutting frame for cutting said glass sheet lengthwise according to said predetermined glass lite sizes, said first mobile cutting carriage means having a plurality of identical cutting block assemblies mounted in a front row and a back row, said cutting block assemblies in said front row laterally offset from said cutting block assemblies in said back row;

a second mobile cutting block carriage means supported on said cutting frame for cutting said glass sheet widthwise according to said predetermined glass lite sizes, said second cutting block carriage means also having a plurality of said cutting block assemblies also mounted in a front row and in a back row, said cutting block assemblies in said front row laterally offset from said cutting block assemblies in said back row;

a plurality of threaded rotatable vertical movement worm gear shafts, one said vertical movement worm gear shaft for each of said rows of said cutting block assemblies of said first mobile cutting carriage means and said second mobile cutting carriage means; and a plurality of threaded rotatable fractional movement worm gear shafts, one said fractional movement worm gear shaft for each of said rows of said cutting block assemblies of said first mobile cutting carriage means and said second mobile cutting carriage means;

whereby said glass sheet is cut into said predetermined lite size by selectively activating particular cutting block assemblies, placing those cutting block assemblies activated in cutting position by means of the rotational movement of said vertical movement and said fractional movement worm gear shafts, and making alternate cutting passes of said first cutting carriage means and said second cutting carriage means over said glass sheet on said molten tin bath.

36. A glass cutting apparatus according to claim 35, wherein each of said cutting block assemblies comprises:

a cutting block cell having vertically extending side and exterior walls, one of said exterior walls having an outwardly protruding wall recess;

a dummy cell adjacent said cutting block cell;

a vertical movement control solenoid having an armature and a coil, said armature movable upon energization of said coil, said solenoid supported on said dummy cell;

cutting block means for cutting a sheet of semi-molten glass, said cutting block means travelling vertically within said cutting block cell from a raised "OFF" position to a lowered "ON" position;

gearing means coupled to a particular one of said vertical movement gear shafts and to said cutting block means for raising and lowering said cutting block means in accordance with the direction of rotation of said particular one of said vertical movement gear shafts;

plunger means coupled to said armature of said vertical control solenoid for engaging said gearing means upon energization of said vertical control solenoid and thereby enabling vertical movement of said cutting block means said plunger means disengaging from said gearing means upon engaging said recess in said cutting block cell wall, and thereby disabling vertical movement of said cutting block means; and compressed air means adjacent said cutting block cell for powering said glass cutting performed by said cutting block means.

37. An apparatus according to claim 36, wherein said cutting block means comprises:

a compressed air-actuated cutting blade having a plurality of air propellant fins extending radially from the center of said blade, said blade commencing rotation upon the application of compressed air against said fins; and compressed air source engagement means coupled to said compressed air means and said cutting blade, for applying compressed air from said compressed air means to said cutting blade when said cutting block means is lowered to said "ON" position.

38. An apparatus according to claim 36, wherein said gearing means comprises:

first gearing means coupled to said vertical movement gear shaft and having a threaded shaft rotatable upon rotation of said vertical movement gear shaft;

a threaded gear sleeve, having a top and a bottom, surrounding and threadingly engaging said threaded shaft of said first gearing means, said sleeve freely rotating in floating association with the rotation of said shaft of said first gearing means;

first and second flanges respectively connected to said top and bottom of said gear sleeve and coupled to said cutting block means;

second gearing means coupled to said first flange for curtailing the free rotation of said gear sleeve and thereby commencing relative rotation between said threaded gear sleeve and said threaded shaft of said first gearing means upon engagement of said second gearing means with said plunger means, said relative rotation producing vertical movement of said sleeve, said first and second flanges, and said cutting block means; and, third gearing means coupled to said second flange for raising said cutting block means to said "OFF" position upon a rotation reversal of said threaded gear sleeve.

39. An apparatus according to claim 25, wherein said third gearing means comprises:

a ratchet gear having skewed gear teeth, said ratchet gear coupled to said second flange; and reversal fin means attached to said cutting block cell for temporarily engaging said skewed teeth of said ratchet gear and only preventing rotation thereof when said ratchet gear rotates in a predetermined direction.

40. An apparatus according to claim 36, wherein each of said cutting block assemblies further comprises:

fractional movement means for precisely moving said cutting block housing laterally within said cutting block assemblies in accordance with a predetermined lite size of said glass sheet.

41. A glass cutting apparatus according to claim 40, wherein said fractional movement means of said cutting block assembly comprises:

a fractional movement solenoid having an armature and a coil, said armature movable upon energization of said coil;

gear threads embossed in the base of said cutting block means;

a fractional movement sleeve gear mounted on said fractional movement gear shaft; said sleeve gear having external threads which engage said embossed gear threads when said cutting block is in said lowered cutting position, a central bearing section, end sections attached to said central bearing section, said end sections having conical openings, said bearing section enabling free rotation of said sleeve gear on said fractional movement shaft;

friction cones mounted on said fractional movement gear shaft and facing said conical openings of said sleeve gear, said friction cones having an interior side of conical shape and a flat exterior side, said friction cones laterally movable on said fractional movement shaft and fixedly rotating with said fractional movement shaft;

linkage yokes attached to said flat exterior sides of said friction cones;

fractional movement linkage means connecting said armature of said fractional movement solenoid and said linkage yokes; and fractional movement circuit means for sensing the fractional movement of said cutting block and stopping said fractional movement of said cutting block in accordance with said predetermined lite size of said glass sheet;

whereby energization of said fractional movement solenoid coil induces movement of said fractional movement solenoid armature, said movement causing said fractional movement linkage means to compress said linkage yokes towards one another, said compression of said linkage yokes causing the frictional engagement of said friction cones with said conical openings of said sleeve gear, said frictional engagement causing rotation of said sleeve gear along with the rotation of said frictional movement gear shaft, said rotation of said sleeve gear causing the fractional movement of said cutting block as a result of the engagement of said sleeve gear with said embossed gear threads when said cutting block is in said lowered "ON" position, said fractional movement circuit means stopping said fractional movement after a predetermined distance.

42. A method for the automated manufacturing of sheet glass comprising the steps of:
melting raw glass batch materials in a vertical furnace;
maintaining molten glass in a homogenous state in a transverse refiner;
cooling the walls of said furnace and said refiner;
maintaining a constant predetermined refiner molten glass level within said refiner;
forming a discrete molten glass charge of a predetermined volume of molten glass and delivering said glass charge from said refiner; and
extruding said glass charge into a sheet of semi-molten glass of a predetermined thickness over a molten tin bath.

43. A method according to claim 42, further comprising the additional steps of:
imparting an ideal smoothness to said glass sheet on said molten tin bath;
cutting said semi-molten glass sheet into predetermined sizes while said glass sheet lies on said tin bath.

44. A method according to claim 43, further comprising the additional steps of:
transferring said semi-molten glass sheet from said tin bath by lowering a transfer unit over said tin bath, applying a partial vacuum to said glass sheet from said transfer unit such that said glass sheet adheres to said transfer unit as a result of the suction forces induced by said partial vacuum, transporting said transfer unit, and releasing said partial vacuum; and
tempering said glass sheet by applying cold air from said transfer unit to the top surface of said cut glass sheet, and by applying cold air to the bottom surface of said cut glass sheet.

45. A method for the automated manufacture of glass sheet according to claim 42, wherein said cooling of said furnace and refiner walls comprises the additional steps of:
constructing an inner furnace and refiner wall lining made of refractory brick;
surrounding and supporting said refractory brick lining with an inner steel plate lining;
surrounding said inner steel plate lining with an outer steel plate lining; and
connecting said inner and outer steel plate linings said inner steel plate lining separated from said second outer steel using steel separators;
whereby said steps of surrounding said inner lining of refractory brick with said inner steel plate lining and said outer steel plate lining form air-cooling passageways within said walls.

46. A method for the automated manufacture of sheet glass according to claim 42, wherein said step of melting said raw glass batch material further comprises:
commencing the melting of raw batch materials by means of removeable pre-heating electrode means located in said vertical furnace; and
removing said pre-heating electrode means from said furnace after the commencement of the melting of raw batch materials.

47. A method according to claim 42, wherein said step of forming and delivering said glass charge comprises:
locating symmetrically within said transverse refiner a plurality of basin cylinders having a plurality of glass dispensing chambers of a known volume;
rotating said basin cylinders within said transverse refiner;
capturing a predetermined volume of molten glass within each of said glass dispensing chambers during each rotation of said basin cylinders; and
depositing said captured molten glass outside from transverse refiner during the rotation of said basin cylinders.

48. A method for the automated manufacture of sheet glass according to claim 42, wherein said step of extruding said molten glass comprises:
storing said charge of molten glass metered from said transverse refiner;
feeding said charge to a molten glass extruding device having a pair of glass sheet rollers;
adjusting the separation of said rollers such that said rollers are separated by a predetermined distance;
traversing said extruding device over said molten tin bath;
extruding said charge of molten glass from said molten glass extruding device through said rollers while said extruding device traverses said molten tin bath; and
generating a supply of compressed air for operating said extruder device as said extruder device traverses said tin bath.

49. A method for the automated manufacture of sheet glass according to claim 42, wherein said step of compressing air further comprises:
heating air during said cooling of said walls of said furnace and said refiner;
admitting air produced by said heating step into a plurality of air compression chambers; and
exhausting said hot air from said plurality of air compression chambers into an air compression reservoir in conjunction with the movement of said extruding device over said molten tin bath.

50. A method of metering molten glass from a source of molten glass comprising the step of:
locating symmetrically a plurality of basin cylinders in communication with said source of molten glass, each basin cylinder having a plurality of glass dispensing chambers of a known volume;
rotating said basin cylinders;

capturing a predetermined volume of molten glass within each of said glass dispensing chambers during each rotation of said basin cylinders; and depositing said captured molten glass outside said source of molten glass during the rotation of said basin cylinders.

51. A method of forming a smooth glass sheet of semi-molten glass comprising the steps of:

metering a discrete charge of molten glass of a known volume from a source of molten glass;

feeding said charge to a molten glass extruding device having a pair of eccentrically pivoting glass sheet rollers;

adjusting the eccentric pivoting of said rollers such that said rollers are separated by a predetermined distance; and extruding said charge of molten glass from said molten glass extruding device through said eccentrically pivoted rollers while moving said extruding device and said rollers over a molten tin bath.

52. A method for the automated manufacture of sheet glass comprising the steps of:

extruding a sheet of semi-molten glass onto a molten tin bath; and cutting said sheet of semi-molten glass to predetermined sizes while said glass sheet is in the semi-molten state on said molten tin bath.

53. An apparatus according to claim 8, wherein each of said molybdenum cartridges comprises:

a cylindrical molybdenum electrode plate;

a rigid cylindrical conductor connected at one end to said electrode plate, said conductor having a terminal at another end for applying external power to said electrode plate, said conductor having a diameter smaller than the diameter of said electrode plate;

a cylindrical electrical and thermal insulator surrounding said conductor and rigidly mounted between said electrode plate and said conductor terminal.

54. An apparatus according to claim 13, wherein each of said molybdenum cartridges comprises:

a cylindrical molybdenum electrode plate;

a rigid cylindrical conductor connected at one end to said electrode plate, said conductor having a terminal at another end for applying external power to said electrode plate, said conductor having a diameter smaller than the diameter of said electrode plate;

a cylindrical electrical and thermal insulator surrounding said conductor and rigidly mounted between said electrode plate and said conductor terminal.

55. A method of manufacturing sheet glass from a charge of molten glass, comprising:

feeding said charge to an extrusion device comprising a container having a first port and a second port, and a pair of rollers exterior to said container and adjacent said second port;

adjusting the distance between said rollers to a predetermined distance; and, applying a pressurized fluid to said first port such that said charge is forced out of said container through said second port and through said rollers under pressure of said pressurized fluid.

56. A method for the automated manufacture of sheet glass comprising the steps of:

forming a sheet of semi-molten glass on a molten tin bath; and cutting said sheet of semi-molten glass to predetermined sizes while said glass sheet is in the semi-molten state on said molten tin bath.

* * * * *